(12) United States Patent
Kittel et al.

(10) Patent No.: US 7,135,973 B2
(45) Date of Patent: Nov. 14, 2006

(54) TAMPER MONITORING ARTICLE, SYSTEM AND METHOD

(75) Inventors: Mark D. Kittel, Berea, OH (US); Joseph Miglionico, Euclid, OH (US); Richard L. Sandt, Brunswick, OH (US); Terrence Sullivan, Medina, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/048,336

(22) Filed: Feb. 1, 2005

(65) Prior Publication Data

US 2005/0179548 A1    Aug. 18, 2005

Related U.S. Application Data

(60) Provisional application No. 60/609,987, filed on Sep. 15, 2004, provisional application No. 60/544,488, filed on Feb. 13, 2004.

(51) Int. Cl.
*G08B 13/12* (2006.01)
(52) U.S. Cl. ............... 340/568.2; 340/571; 340/572.1
(58) Field of Classification Search ......... 340/568.1–4, 340/568.7, 572.1, 571
See application file for complete search history.

(56) References Cited

U.S. PATENT DOCUMENTS

| | | | |
|---|---|---|---|
| 3,961,323 A | 6/1976 | Hartkorn | 340/280 |
| 4,262,284 A | 4/1981 | Stieff et al. | 340/568 |
| 4,287,514 A | 9/1981 | Wartman et al. | 340/569 |
| 4,574,192 A | 3/1986 | Kitagawa et al. | 250/227 |
| 4,636,408 A | 1/1987 | Anthony et al. | 427/160 |
| 4,729,626 A | 3/1988 | Stieff | 350/96.22 |
| 4,746,052 A * | 5/1988 | Schmissrauter | 229/102 |
| 4,840,480 A | 6/1989 | Starke et al. | 356/32 |
| 4,857,893 A | 8/1989 | Carroll | 340/572 |
| 4,876,123 A | 10/1989 | Rivera et al. | 428/34.2 |
| 4,878,045 A | 10/1989 | Tanaka et al. | 340/556 |
| 4,883,054 A | 11/1989 | Fuller et al. | 128/303.1 |
| 5,013,908 A | 5/1991 | Chang | 250/227.15 |
| 5,015,842 A | 5/1991 | Fradenburgh et al. | 250/227.15 |
| 5,023,595 A | 6/1991 | Bennett | 340/569 |
| 5,032,823 A | 7/1991 | Bower et al. | 340/568 |
| 5,097,253 A | 3/1992 | Eschbach et al. | 340/545 |
| 5,111,184 A | 5/1992 | Heaton et al. | 340/542 |

(Continued)

FOREIGN PATENT DOCUMENTS

WO        98/35243        8/1998

*Primary Examiner*—Daniel Wu
*Assistant Examiner*—Travis R. Hunnings
(74) *Attorney, Agent, or Firm*—Renner, Otto, Boisselle and Sklar LLP

(57) ABSTRACT

A tamper monitoring article and system, and an associated method of making, installing and using the article and system. The article has an elongate body portion. The body portion has a first end portion that adheres to a second end portion, if present, or to a substrate. The article also includes a pathway structure that runs along or throughout the body portion and can conduct energy, such as light or electricity, along its length. A monitor communicates with the pathway structure and detects a change in the energy being conducted thereby. A change in the energy is indicative of a change in a conductive property of the pathway structure caused by, for example, manipulation of the body portion and the pathway structure that is disposed therein or thereon. The monitor can then signal, or respond to a request signal, and provide information that such manipulation has occurred.

41 Claims, 10 Drawing Sheets

U.S. PATENT DOCUMENTS

| | | | |
|---|---|---|---|
| 5,112,890 A | 5/1992 | Behrens et al. | 524/95 |
| 5,162,390 A | 11/1992 | Tilley et al. | 522/64 |
| 5,189,396 A * | 2/1993 | Stobbe | 340/541 |
| 5,202,673 A | 4/1993 | Conrad | 340/524 |
| 5,285,734 A | 2/1994 | MacPherson | 109/42 |
| 5,369,140 A | 11/1994 | Valet et al. | 522/75 |
| 5,406,263 A * | 4/1995 | Tuttle | 340/572.1 |
| 5,421,177 A | 6/1995 | Sieber et al. | 70/57.1 |
| 5,440,289 A | 8/1995 | Riordan | 340/550 |
| 5,506,566 A | 4/1996 | Oldfield et al. | 340/550 |
| 5,506,567 A | 4/1996 | Bichlmaier et al. | 340/555 |
| 5,559,163 A | 9/1996 | Dawson et al. | 522/75 |
| 5,612,675 A | 3/1997 | Jennings et al. | 340/573 |
| 5,646,592 A | 7/1997 | Tuttle | 340/572 |
| 5,656,996 A | 8/1997 | Houser | 340/541 |
| 5,689,243 A | 11/1997 | Bianco | 340/825.3 |
| 5,804,810 A | 9/1998 | Woolley et al. | 235/492 |
| 5,831,531 A | 11/1998 | Tuttle | 340/572 |
| 5,884,425 A | 3/1999 | Baldwin | 40/638 |
| 5,898,370 A | 4/1999 | Reymond | 340/540 |
| 5,936,530 A | 8/1999 | Meinhold | 340/573.1 |
| 6,002,343 A | 12/1999 | Auerbach et al. | 340/825.54 |
| 6,027,027 A | 2/2000 | Smithgall | 235/488 |
| 6,043,746 A | 3/2000 | Sorrells | 340/572.7 |
| 6,050,622 A | 4/2000 | Gustafson | 292/307 R |
| 6,069,563 A | 5/2000 | Kadner et al. | 340/571 |
| 6,133,836 A | 10/2000 | Smith | 340/572.7 |
| 6,236,314 B1 | 5/2001 | Smith et al. | 340/572.7 |
| 6,265,973 B1 | 7/2001 | Brammall et al. | 340/568.1 |
| 6,278,369 B1 | 8/2001 | Smith et al. | 340/572.7 |
| 6,304,183 B1 | 10/2001 | Causey | 340/572.1 |
| 6,333,693 B1 | 12/2001 | Smith | 340/572.7 |
| 6,339,385 B1 | 1/2002 | Tuttle | 341/10.42 |
| 6,400,268 B1 | 6/2002 | Lindskog | 340/550 |
| 6,416,857 B1 | 7/2002 | Wright et al. | 428/343 |
| 6,420,971 B1 | 7/2002 | Leck et al. | 340/542 |
| 6,424,262 B1 | 7/2002 | Garber et al. | 340/572.3 |
| 6,448,886 B1 | 9/2002 | Garber et al. | 340/10.1 |
| 6,514,367 B1 * | 2/2003 | Leighton | 156/153 |
| 6,536,082 B1 | 3/2003 | Berrocal et al. | 24/16 PB |
| 6,569,508 B1 | 5/2003 | Babb et al. | 428/40.1 |
| 6,608,911 B1 * | 8/2003 | Lofgren et al. | 382/100 |
| 6,640,394 B1 | 11/2003 | Berrocal et al. | 24/16 PB |
| 6,662,430 B1 | 12/2003 | Brady et al. | 29/600 |
| 2002/0008623 A1 | 1/2002 | Garber et al. | 340/572.1 |
| 2002/0089434 A1 | 7/2002 | Ghazarian | 340/988 |
| 2003/0075608 A1 | 4/2003 | Atherton | 235/492 |
| 2004/0119593 A1 | 6/2004 | Kuhns | 340/572.7 |

* cited by examiner

TAMPER MONITORING ARTICLE, SYSTEM AND METHOD

This application claims the benefit of provisional application 60/544,488 filed on Feb. 13, 2004 and provisional application 60/609,987 filed Sep. 15, 2004, which are hereby incorporated herein by reference in their entirety.

BACKGROUND OF THE INVENTION

1. Field of the Invention

The present invention relates generally to a tamper monitoring article, system and method of use. In particular, the invention relates to a seal article that is operable to self monitor its integrity and to indicate, actively or passively, when its integrity has been or is being reduced or compromised.

2. Discussion of Related Art

From time to time it has been desirable not only to lock items or secure the items in some fashion, but also to determine whether the lock or security of the item has been breached or that the item has been tampered with. At one time, a person wanting to write a confidential letter would employ a wax seal to close the letter, and would emboss the seal with a difficult-to-reproduce pattern or imprint. A recipient of the letter would know if the letter had been opened and read by the integrity of the embossed wax seal. If the seal was intact, the recipient could reasonably conclude that the letter had not been tampered with since sealing. But, the wax seal was easy to defeat, and did not work sufficiently well in applications outside of sealing paper documents, such as in lock-type applications.

Seals made of non-wax materials, especially malleable metals that were more robust than wax, were employed subsequently. These metal seals could be made into self-fastening strips, and then could be used in combination with locks to determine whether the locks had been opened during some interim period. While more robust than wax, the metal seals were also insufficient for some applications. The seals were too easy to defeat, and were unable to be sufficiently monitored during use.

To address the issue of monitoring, a loop of wire was run through a sealing device, the loop ends started and ended at a monitor. The sealing device was configured so that if the integrity of the sealing device was compromised, the continuity of the wire loop was reduced or eliminated. The monitor checked the continuity of the wire. Thus, a break in the wire loop would result in a break in the wire continuity, which was detected by the monitor. Accordingly, the sealing device integrity could be monitored.

A fiber optic seal having a fiber optic bundle and a locking device for the free ends of the fibers in the bundle was used to determine whether a secure installation remained unpenetrated over a period of time. The random arrangement of fibers in each bundle offered an added measure of security in that it was difficult to reproduce an exact replica of the random fiber pattern using a replacement bundle of fibers. As before, removal, tampering or otherwise destroying the sealing device had the effect of manipulating or breaking the fibers which would result in a detectable change in the fiber optic bundle.

U.S. Pat. No. 4,883,054 to Fuller et al. discloses an apparatus for detecting a break in an optical fiber that can transmit laser light. The fiber communicates with a laser light detector, which can detect a break in the fiber or a change in the laser light transmission. Thus, it is possible to monitor the integrity of an optical fiber, and detect breaks or changes in the fiber.

A tripwire and a magnetic circuit technique can detect continuity of a circuit in other electronic sealing devices. The circuit continuity is monitored and communicated to an associated radio frequency identification device (RFID). A break in the circuit can cause the RFID to signal an associated RFID monitor that there was a break in the continuity of the circuit. Thus, unauthorized openings of containers can be detected and communicated via RFID.

For applications that have increased volumes or numbers of containers, such as transporting luggage bags through airports, it can be problematic to attach currently available sealing devices to as many container openings as might be desirable. While some commercially available sealing devices may be convenient to use, such as those devices having a pressure sensitive adhesive for attaching strap ends together, those sealing devices may be too easily circumvented. For example, some pressure sensitive adhesives are known to lose adhesivity at temperature extremes. Thus, freezing or heating the pressure sensitive adhesive not only allows the sealing device to be removed without breaking a continuity circuit, but may also allow replacement of the same seal device after the unauthorized entry into the sealed container leaving no evidence of an unauthorized entry.

In the field of radio frequency identification devices ("RFID"), communication systems have been developed utilizing relatively large packages. These relatively large electronic packages have been affixed, for example, to railroad cars to reflect radio frequency (RF) signals in order to monitor the location and movement of such cars. As with most electronic applications, the size of such devices has decreased over time. Other, smaller RFID packages have been developed for applications in the field of transportation and logistics, examples include automobile and library book tracking. These packages include passive or reflective systems of the type produced by Amtech Inc. (Dallas, Tex.).

In still other applications of article location and tracking, such as in the postal service or in the field of airline baggage handling and transport, it has become practical and feasible to use RFID devices on smaller articles of transport such as letters, boxed mail shipments and airline luggage.

Alternatives to RFID device tracking and monitoring include bar code identification and optical character recognition (OCR) techniques. Bar code identification and OCR techniques are labor intensive and may, for example, require physical manipulation of the article and/or bar code readers to read these bar codes before the transported article reaches its final destination. In addition, the cost of bar code readers and optical character readers can be prohibitive thus reducing the number of locations at which these readers can be used. Furthermore, both bar code readers and optical character readers are sometimes insufficiently reliable.

In the fields of animal tracking, other types of passive RFID tags have been developed by Hughes, Inc., a subsidiary of Destron Corporation (Irvine, Calif.). These tags utilize a coil wrapped around a ferrite core. Such passive RFID tags have an undesirably limited range, on the order of about 23 centimeters (9 inches), have undesirably limited data handling capability, and are difficult or impossible to program in a field environment. Other disadvantages of the tags can include undesirably limited data storage capacity, and the speed of operation.

Accordingly, it would be desirable to have a signaling device with at least some improved properties relative to the currently available options for tracking, monitoring and signaling devices and techniques.

It would be desirable to have a security article having improved properties. For example, such properties might include ease of use and cost economy. Other desirable properties might include an additional level of security or an increased tamper resistance.

SUMMARY OF THE INVENTION

The present invention provides a tamper monitoring article and system, and an associated method of making, installing and using the article and system. In particular, the present invention provides an elongate body portion. The body portion has a first end portion and a second end portion. The first end portion can be adhered to the second end portion or to a substrate. A pathway extends along the body portion. The pathway responds to manipulation by indicating that manipulation has occurred. The first end can secure to the substrate or second end portion and can indicate whether the body portion has been manipulated thus monitor tampering with the body portion.

The pathway may be a fiber optic cable that communicates with a monitor. The monitor may send light through the cable to monitor the integrity of the cable. By manipulating the cable, the light being sent through the cable changes in a way that is detectable by the monitor. For example, if the cable is cut, then the light transmission ceases. The monitor can then indicate, either actively or passively, that the manipulation or "tamper event" has occurred.

According to one aspect of the invention, the first end portion includes a heat sealable material. The heat sealable first end responds to heat by forming a heat seal structure. The heat seal structure, when cool, adheres the first end portion to another surface. That other surface can be, for example, on a different end of the body portion or on a substrate that is not otherwise part of the tamper monitoring article.

According to another aspect of the invention, the first end portion includes an embossable layer. The embossable layer is physically, magnetically and/or holographically embossable. If the embossable layer is physically embossable, it responds to physical manipulation, such as pressure from a heated platen. For example, when the heated platen contacts the embossable layer with a predetermined amount of heat and pressure, the embossable layer conforms to the texture of the heated platen surface. The embossable layer maintains the imparted texture after cooling and indicates official sealing status by the presence of the imparted texture. If the embossable layer is magnetically embossable, it comprises magnetic or magnetizable material responds to magnetic manipulation. For example, a specific magnetic pattern can be imparted to the embossable layer. The embossable layer retains the magnetic pattern and the pattern can be read and verified by a suitable magnetic reader device. If the embossable layer is holographically embossable, it responds to, for example, laser light, which can form a difficult-to-reproduce holographic image thereon.

According to still another aspect of the invention, a tamper monitoring article, includes: a pathway structure responsive to manipulation by indicating that manipulation has occurred; and a monitor operatively coupled to the pathway structure, to allow detection of manipulation of the pathway structure by detection an interruption in the pathway structure. The pathway structure is configured to be placed at least in part around an object to be monitored.

According to yet another aspect of the invention, a security strap includes: a data-carrying medium; and a coating encircling the data-carrying medium. The coating as plural transverse ridges protruding therefrom.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF PREFERRED EMBODIMENTS

The present invention provides generally a tamper resistant, evidencing and/or monitoring article for use in securing an opening in, for example, a container or door, and further provides methods of making and using the article. The article can be, for example, a strip for looping around handles or a strap for sealing a door closed. Tamper evidencing systems present in the article indicate when and if the article has been cut, stretched, removed and/or broken. Accordingly, the tamper evidencing systems also indicate if the item being sealed by the present article have been accessed or tampered with. In distinction with a lock, which may be designed to keep a person out or an item shut, embodiments of the present invention can act as a seal that records or indicates entry, a barrier seal that provides some minor locking function and sealing function, and a tag that uses intrinsic properties to uniquely identify an object or item.

Figure 1:
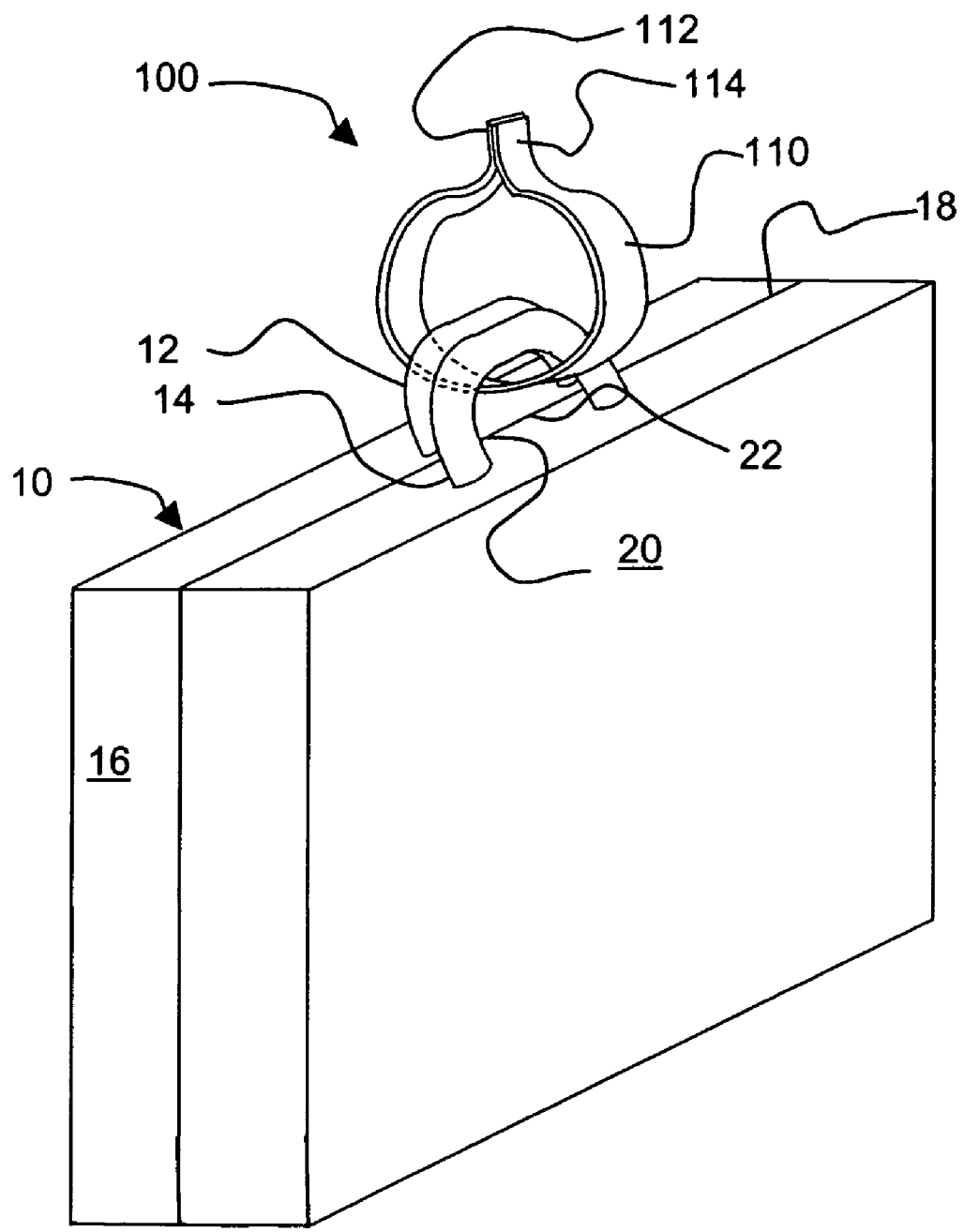
FIG. 1 is a schematic diagram showing a perspective view of an article comprising a first embodiment in accordance with the present invention in an operative condition adjacent to a container.

With reference to FIG. 1, an embodiment of the present invention is shown in an operative condition with a briefcase 10 having first and second handles 12, 14 that are attached to the briefcase 10 along a peripheral edge 16. The briefcase 10 opens along an openable seam 18 that divides the edge 16 and allows the briefcase 10 to open like a clam shell. The first handle 12 attaches to the edge 16 on one side of the seam 18, and the second handle 14 attaches to the edge 16 on the opposite side of the seam 18. Thus, when the briefcase 10 is open, the handles 12, 14 are spaced further apart from each other relative to when the briefcase 10 is closed. Hinges, not shown, are on the peripheral edge 16 opposite the handles 12, 14. Because of the arrangement of the handles 12, 14 relative to the seam 18 on this type of luggage or container (e.g., the briefcase 10), it is possible to prevent unmonitored access to the briefcase interior by determining whether the handles 12, 14 have been moved apart from each other. The handles 12, 14 each have an inner surface 20 that cooperates with a surface of the peripheral edge 16 to define an aperture 22.

A tamper monitoring article 100 comprising a first embodiment according to the present invention is shown in FIGS. 1–4. The article 100 includes a flexible, elongate body portion 110 having a first free end portion 112 spaced from a distal, second free end portion 114. The body portion 110 extends through the handle aperture 22. The body portion 110 wraps around the handles 12, 14 so that the first and second end portions 112, 114 are adjacent to each other. The first and second end portions 112, 114 are secured to each other as detailed further hereinbelow.

The tamper monitoring article 100 may be generally strip-shaped and has an outer surface 120 spaced from an inner surface 122 by a peripheral edge 124. In this embodiment, the first end portion 112 may be adjacent to the second end portion 114 and secured thereto along a portion of the inner surface 122. In alternative embodiments, the first end portion 112 secures to second end portion 114 such that a portion of the inner surface 112 may be adjacent to a portion of the outer surface 120. In such alternative embodiments, the first end portion 112 laps over the second end portion 114.

Figure 2:
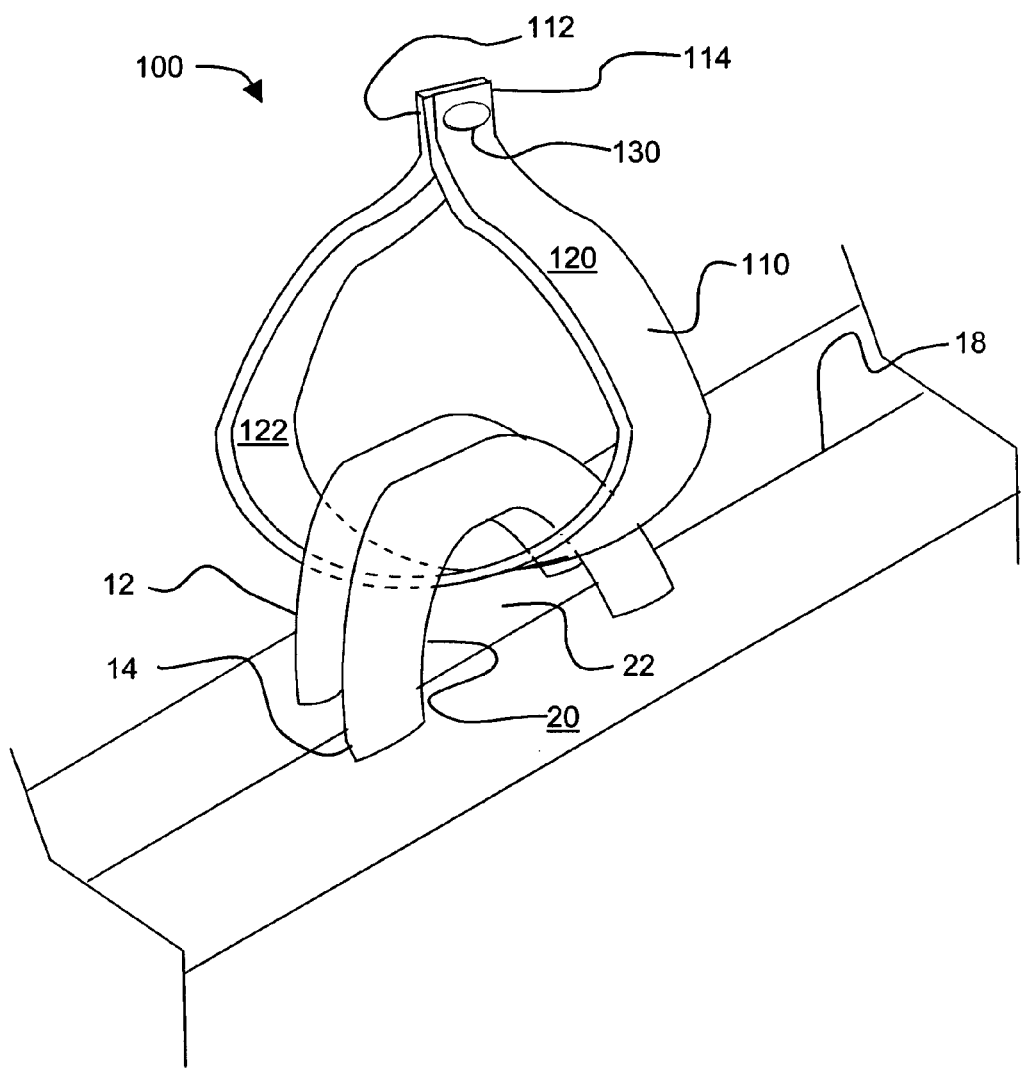
FIG. 2 is a schematic diagram showing an enlarged perspective view of the article of FIG. 1, with a portion of the container cut away.
Figure 3:
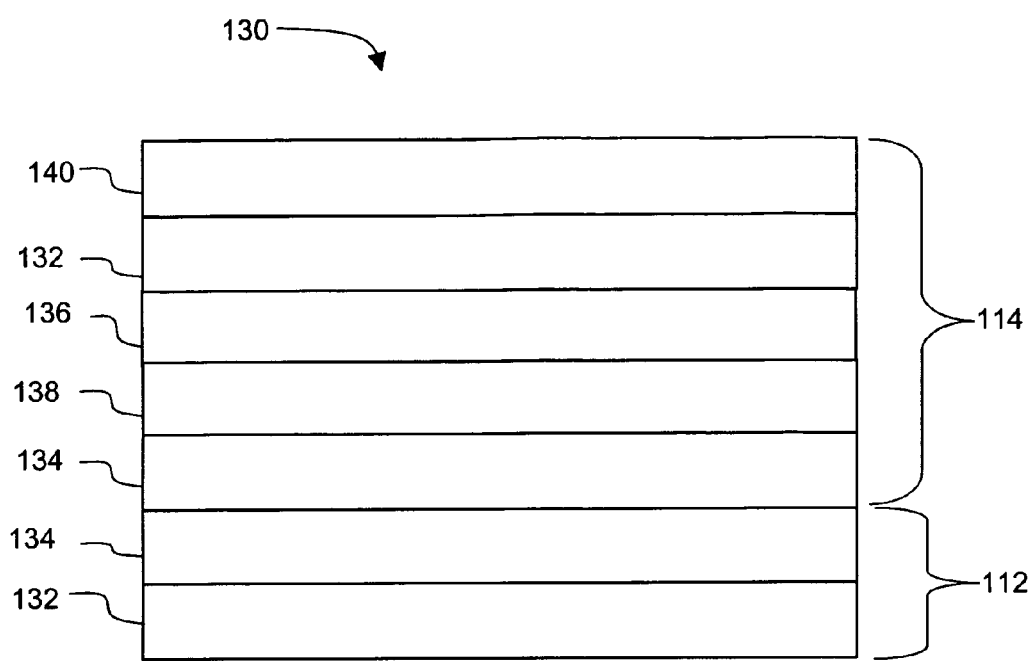
FIG. 3 is a schematic diagram showing a side view of a portion of the article of FIG. 1.
Figure 4:
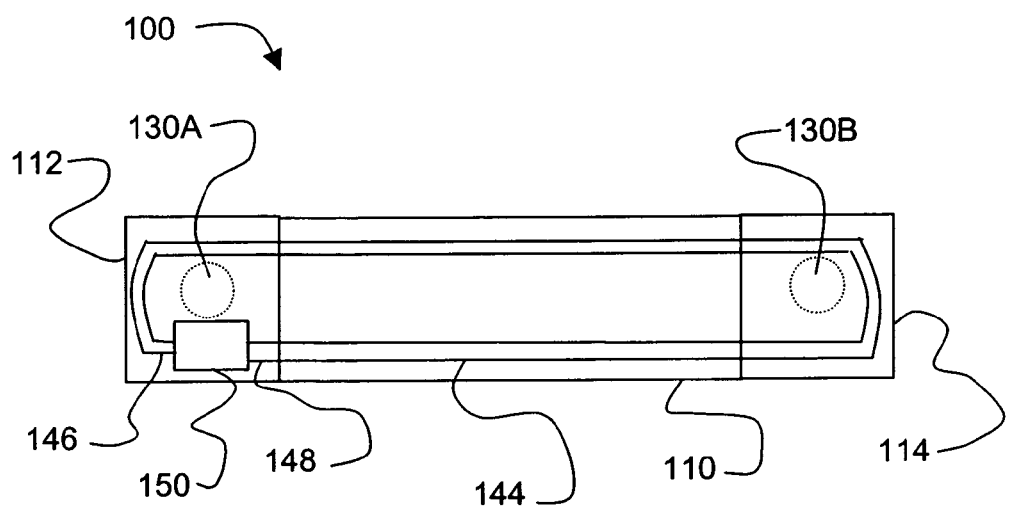
FIG. 4 is a schematic top plan view of the article of FIG. 1, laid flat and with portions removed to view components contained therein.
Figure 5:
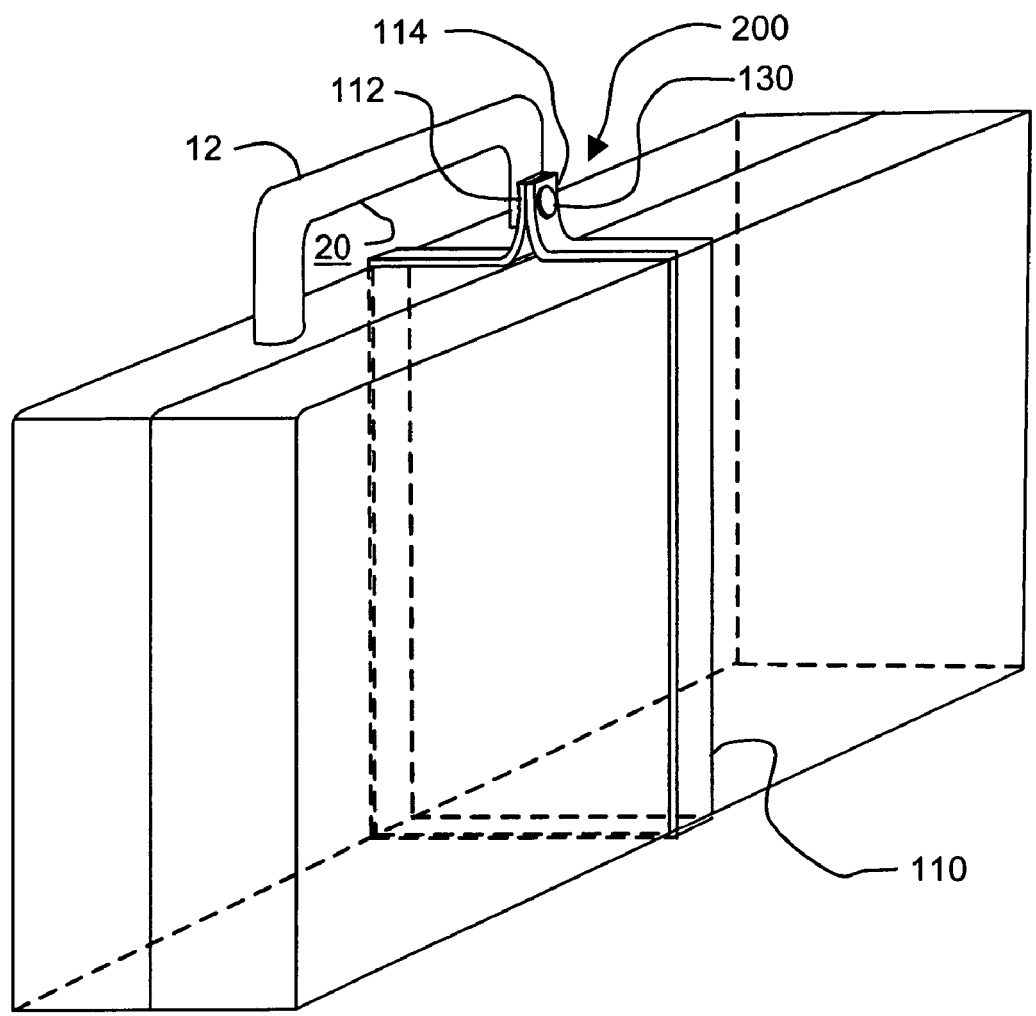
FIGS. 5–7 are schematic diagrams of articles comprising alternative embodiments in accordance with the invention.

With particular reference to FIGS. 2–3, a seal structure 130 secures or seals the first end portion 112 to the second end portion 114. In this embodiment, the seal structure 130 includes a facestock 132, an adhesive layer 134, a print layer 136, an embeddable layer 138 and an embossable layer 140. As indicated in FIG. 3, some of the layers forming the seal structure 130 are in both the first and second end portions 112, 114, and some layers are only in the second end portion 114. Turning to FIG. 4, when the article 100 is in a flattened and unsecured condition, the seal structure 130 (which is not shown formed in FIG. 4) is formed from a first seal portion 130A disposed on the first end portion 112, and from a second seal portion 130B disposed on the second end portion 114. A conductive path 144 forms a loop or circuit that passes around the seal structure portions 130A, 130B and extends along the length of the body portion 110. The pathway 144 has a first end 146 and a second end 148, and each communicates with a monitor 150. The various components of this embodiment are described in more detail hereinbelow.

The Facestock

The body portion 110 includes many or all of the layers that form the first and second ends 112, 114 in the embodiment illustrated in FIGS. 1–4, and with particular reference to FIG. 3. In alternative embodiments, the body portion 110 may have layers that differ from the layers that form the end portions 112, 114, and the end portions 112, 114 may have layers that differ from each other. In this embodiment, for example, the facestock 132 extends from the first body end 112 through the body portion 110 and to the second body end 114. Other layers, such as the adhesive layer 134, can be disposed at each of the end portions 112, 114, only at one of the end portions 112, 114, or can be co-extensive with the entire facestock 132. In this embodiment, the adhesive layer 134 and the facestock layer 132 may be coextruded and, thus, may be substantially coextensive.

The facestock 132 may have an overall thickness average in a range of from about 2.5 micrometers (0.1 mil) to about 635 micrometers (25 mils), and in one embodiment the average thickness may be in the range of from about 25 micrometers to about 250 micrometers, and in one embodiment the average thickness may be in the range of from about 300 micrometers to about 600 micrometers.

In one embodiment, the facestock 132 may be a high density polyethylene (HDPE) extruded film. A suitable HDPE may be FORMOLINE LH5206, which is commercially available from Formosa Plastics Corporation (Point Comfort, Tex.). In one embodiment, the HDPE has a density in a range of from about 0.9 grams per cubic centimeter ($g/cm^3$) to about 1.0 gram per cubic centimeter but in alternative embodiments other densities can be selected to achieve specific desired properties. The facestock 132 may be a transparent colorless biaxially oriented film. In one embodiment, the facestock 132 can be a machine direction oriented film or a transverse oriented film, may be transparent or opaque, and may be colored, colorless or patterned. In one embodiment, the biaxial orientation may be accomplished via a hot-stretch and annealed orientation process. In one embodiment, the orientation may be achieved by other orientation processes selected with reference to production specific criteria, such as cost, speed and available equipment.

A suitable alternative facestock may be extruded also or may be otherwise formed, and can be a monolayer film, a multi-layered film, or a composite. The facestock may include a substrate formed of non-ethylenic olefin polymers (linear or branched) or polyolefinic materials such as polypropylene, polyamides, polystyrenes, nylon, polyesters, polyester copolymers, polyurethanes, polyacrylates, polysulfones, styrene-maleic anhydride copolymers, styrene-acrylonitrile copolymers, ionomers based on sodium or zinc salts of ethylene methacrylic acid, polymethyl methacrylates, cellulosics (including both paper and wood products), fluoroplastics such as polyvinylidene fluoride (PVDF), polycarbonates, polyacrylonitriles, polycyanurates, ethylene-vinyl acetate copolymers, metal foils, metallized films, silicones, and combinations thereof. The polyacrylates include acrylates such as those derived from ethylene methacrylic acid, ethylene methyl acrylate, ethylene acrylic acid and ethylene ethyl acrylate.

The facestock may be made of a cellulosic material, such as paper having a base weight in a range of from about 20 pounds per ream to about 150 pounds per ream (lb/ream). In one embodiment, paper having a base weight average in a range of from about 30 lb/ream to about 60 lb/ream may be used. The cellulosic facestock may be polymer-coated paper, having one or both sides coated with a polymer layer. The polymer layer may comprise high, medium or low density polyethylene, polypropylene, polyester, and combinations thereof. The polymer layer may be added to increase strength and/or provide dimensional stability. The polymer-coated paper may have a weight in a range of from about 5 lb/ream to about 50 lb/ream. The polymer layer may comprise an amount of the total weight of the facestock may be in a range of from about 10 percent by weight to about 50 percent by weight. If the facestock is polymer-coated on two sides, the quantity of polymer may be about equally divided between the two sides, or may be present on one side in a greater amount relative to the other side.

The facestock may be made of polypropylene. Bi-axially oriented polypropylene (BOPP) may be particularly suited to a wide range of applications in accordance with the present invention. Included may be polypropylene homopolymers and copolymers. In one embodiment, the polypropylene homopolymer has a melt flow rate (MFR) in a range of from about 0.5 to about 20 (as determined by ASTM Test D 1238). In one embodiment, the polypropylene has an MFR in a range of from about 4 to about 10. In other embodiments according to the invention, the propylene homopolymer has a density in a range of from about 0.88 to about 0.92 g/cm$^3$.

The facestock may be made of polyamide. A suitable polyamide resin is commercially available from American Grilon Inc. (Sumter, S.C.) under the tradename GRIVORY G-21. GRIVORY G-21 is an amorphous nylon copolymer having a glass transition temperature ($T_g$) of about 126 degrees Celsius, a melt flow index (MFI) of about 90 milliliters per 10 minutes (mm/10 min) as measured by DIN 53735, and an elongation at break of about 15 as measured by ASTM D638.

The facestock may be made of polystyrene. Suitable polystyrenes include homopolymers of styrene as well as copolymers and substituted styrene. An example of a commercially available suitable styrene is KR-10 of Phillips Petroleum Co. (Bartlesville, Okla.).

Facestocks in accordance with the invention can include a migratory and/or a non-migratory additive. Suitable migratory additives include, for example, a flexibilizer, a plasticizer, and an antioxidant. And, suitable non-migratory additives can include a blocking agent, an anti-blocking agent, a flame retardant, an opacifier, a heat and light stabilizer, a UV light blocker, an anti-static agent, and other additives selected with reference to application specific criteria. The flexibilizer can be, for example, a rubber, rubber-based derivative or thermoplastic. In one embodiment, the flexibilizer may be a rubber methacrylate. In one embodiment, the flexibilizer may be a carboxy-terminated butadiene-nitrile rubber (CTBN).

The plasticizer can be a high-boiling temperature liquid solvent or a softening agent. Specifically, the plasticizer can be an ester made from an anhydride or acid and a suitable alcohol having from about 6 carbon atoms to about 13 carbon atoms. Other suitable plasticizers include adipate, phosphate, benzoate or phthalate esters, polyalkylene oxides, sulfonamides, and the like. These plasticizers include dioctyl adipate plasticizer (DOA), triethylene glycol di-2-ethylhexanoate plasticizer (TEG-EH), trioctyl trimellitate plasticizer (TOTM), glyceryl triacetate plasticizer (TRIACETIN), 2,2,4-trimethyl-1,3-pentanediol diisobutyrate plasticizer (TXIB), diethyl phthalate plasticizer (DEP), dioctyl terephthalate plasticizer (DOTP), dimethyl phthalate plasticizer (DMP), dioctyl phthalate plasticizer (DOP), dibutyl phthalate plasticizer (DBP), polyethylene oxide, toluene sulfonamide, and dipropylene glycol benzoate. Other commercially available plasticizers may be interchangeable therewith with reference to such considerations as compatibility and intended purpose.

The antioxidant provides radical trapping activity and may be selected generally with reference to at least some of the following considerations: the compatibility with the matrix of the facestock 132, the effective stability of the antioxidant at the processing temperatures, whether the antioxidant will cause undesirable coloring, and whether the antioxidant will interact with other additives. Further, the antioxidant should inhibit ageing during processing, during storage and during the end use. Useful antioxidants include tert-butylhydroquinone, propyl gallate, sodium nitrate, sodium nitrite, butylated hydroxytoluene (BHT), and butylated hydroxyanisole (BHA) and analogs and derivatives. Suitable additives are commercially available from such suppliers as Ciba Specialty Chemicals, Inc. (Tarrytown, N.Y.) and Ferro Corp. (Independence, Ohio).

The facestock 132 can have optional reinforcement throughout its matrix. In one such embodiment, the reinforcement may be in the form of tough multi-directionally oriented fibers. The fibers can be, for example, polyamid, metal, or selected from other difficult to cut or break materials. In one embodiment, the reinforcement includes randomly oriented fibers or unidirectionally oriented fibers.

In one embodiment, the facestock 132 may be multi-layered, and the facestock 132 can include a print layer or skin layer for receiving graphics or print; a frangible layer for indicating if a facestock has been stretched, cut or broken; tie layers for holding multiple layers together; a heat resistant layer for maintaining structural integrity in temperature extremes; an abrasion resistant layer for increasing abrasion resistance; a conductive layer for complimenting the conductive pathway 144; an optically opaque layer for protecting optical fibers and embedded optics; an anti-static layer; a moisture resistant layer; and, an electrically insulative layer for protecting the monitor 150, the pathway 144 and/or forming a capacitance charge.

The Adhesive Layer

In one embodiment, the adhesive layer 134 may be a 100% solid thermoplastic adhesive that achieves a solid state and resultant strength by cooling. Heating the adhesive layer 134 to a temperature in a range of, for example, from about 175° Celsius to about 205° Celsius (350° to 400° Fahrenheit), causes the adhesive layer 134 to change phase state from a solid to a liquid. Subsequent to the removal of heat, the adhesive layer 134 sets by cooling. In one embodiment, the adhesive layer 134 may be a low density polyethylene (LDPE) temperature responsive layer that can be coextruded with the facestock 132. Other suitable adhesives include S-246, which is a hot melt rubber based pressure sensitive adhesive and is manufactured by the Fasson Division of Avery Dennison Corporation, and S-490, which is an acrylic emulsion PSA that is manufactured by the Chemicals Division of Avery Dennison Corporation.

A suitable temperature responsive adhesive generally has a lower melting point than any of the other layers used in the multi-layer construction. Typically, the melting point, as determine by differential scanning calorimetry (DSC), of the temperature responsive adhesive is in a range of from about 50 degrees Celsius to about 150 degrees Celsius. In one embodiment the melt temperature is in a range of from about 70 degrees Celsius to about 85 degrees Celsius. The melting point of the temperature responsive adhesive is, in one embodiment, at least 10 degrees Celsius lower than the melting point of the facestock 132.

The use of a temperature responsive adhesive can reduce or eliminate the use of a solvent-based adhesive. A reduction in the application time and quantity of the adhesive necessary can be realized as a result. However, some embodiments may use a pressure sensitive adhesive or an emulsion or aqueous dispersion adhesive, a solvent solution adhesive, a film membrane adhesive, or some combination thereof.

The adhesive layer 134 may be a heat-activated adhesive. A heat-activated adhesive differs from a temperature responsive adhesive in that it is substantially inert at ambient temperatures but forms a surface or interfacial bond having increased bond strength (adhesive strength) relative to the cohesive strength of the substrate by forming chemical bonds with, for example, polar groups located on a substrate surface. As such, the adhesive bond may be tenacious and can be selected to be resistant to aggressive agents or environments, such as solvents or acids in the case of agents, and temperature extremes in the case of environment. However, other heat-activated adhesives, radiation initiated adhesive and/or chemical initiated adhesives may be employed, alone or in combination with the above described adhesives, that strongly, but not necessarily permanently bond to a substrate surface. The bond strength can be determined by, for example, selection of materials.

Suitable alternative adhesive materials include self-priming and thermosetting adhesive compositions having a polar characteristic, a high surface energy and, when cured, resistance to many types of environmental attack. These suitable alternative adhesives include acrylics and methacrylates, epoxies, urethanes, derivatives, and combinations thereof, and the like.

A suitable methacrylic-based adhesive includes a urethane methacrylate adhesive. A suitable acrylic-based structural adhesive may be formed from alkylene glycol diacrylate and methacrylate monomers. Such alkylene glycol diacrylate monomers can be selected from mono-, di-, tri- tetra- and polyethylene glycol dimethacrylate and corresponding diacrylates; dipentamethylene glycol dimethacrylate; tetraethylene glycol dichloroacrylate; diglycerol diacrylate; diglycerol tetramethacrylate; butylene glycol dimethacrylate; neopentyl glycol diacrylate; and trimethylolpropane triacrylate. Additionally, suitable acrylic-based structural adhesives include ethoxylated trimethylolpropane triacrylate, trimethylol propane trimethacrylate, dipentaerythritol monohydroxy pentacrylate, pentaerythritol triacrylate, ethoxylated trimethylolpropane triacrylate, 1,6-hexanediol diacrylate, neopentyl glycol diacrylate, pentaerythritol tetraacrylate, 1,2-butylene glycol diacrylate, trimethylol propane ethoxylate trimethacrylate, glyceryl propoxylate trimethacrylate, trimethylol propane trimethacrylate, dipentaerythritol monohydroxy pentamethacrylate, tripropylene glycol dimethacrylate, neopentylglycol propoxylate dimethacrylate, 1,4-butanediol dimethacrylate, polyethylene glycol dimethacrylate, triethylene glycol dimethacrylate, butylene glycol dimethacrylate, ethoxylated bisphenol A dimethacrylate, combinations thereof, and the like.

A suitable epoxy-based structural adhesive may be formed from a resin having one or more functional oxiranyl (oxirane) groups. The epoxy-based structural adhesive can include a curative or cure accelerant, such as cumene hydroperoxide, which may be reactive with the oxirane group. Curatives that react with oxirane groups include di- and polyamines, di- and polythiols, di- and polyphenols, di- and polyanhydrides, di- and polycarboxylic acids, imidazoles, imidazole metal complexes, as well as certain metal salts that initiate cationic polymerization.

Suitable urethane type monomers include urethane-acrylate-capped prepolymers based on polybutadiene polyols or polyamines and acrylates or methacrylates derived from bisphenol-A, such as bisphenol-A dimethacrylate, hydrogenated bisphenol-A dimethacrylate, and ethoxylated bisphenol-A dimethacrylate. Monofunctional acrylate esters (esters containing one acrylate group) also may be used. Also useful are the acrylate esters having a relatively polar moiety. Polar groups may be selected from labile hydrogen, heterocyclic ring, hydroxy, amino, cyano, and halogen polar groups. Examples of suitable compounds include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The acrylate esters can be incorporated as reactive diluents capable of copolymerizing with various other polymerizable materials.

The method that may be used to apply the adhesive may be influenced by physical and production requirements of the adhesive, and can include such methods as spray, roll, and die application methods. In some embodiments according to the invention, the pressure sensitive adhesive material may be applied as a hot melt, a solution, or an emulsion by a die application method. In addition to coextrusion, other useful techniques for applying the adhesive layer 134 to the facestock 132 include gravure, reverse gravure, offset gravure, roller coating, brushing, knife-over roll, metering rod, reverse roll coating, doctor knife, dipping, die coating, spraying, curtain coating, slot head, flat screen and other similar methods. A useful metering rod may be a Meyer Rod.

After application and/or during use, the adhesive layer 134 may have a first major surface in adhesive contact with the surface of the first end portion 112, and a peripheral edge that defines a boundary between the first major surface and a second major surface. The second major surface may be, with reference to the embodiment shown in FIG. 3, in adhesive contact with a major surface of the print layer 136. Both adhesive surfaces are substantially planar. The peripheral edge has a thickness in a range of from about 12.7 micrometers (0.5 mils) to about 127 micrometers (5 mils). In one embodiment, the thickness may be in a range of from about 25.4 micrometers (1 mil) to about 76 micrometers (3 mils), and in one embodiment, the thickness may be in a range of from about 25.4 micrometers (1 mil) to about 38 micrometers (1.5 mils). The coat weight of the pressure sensitive adhesive in one embodiment may be in a range of from about 10 grams per square meter (gsm) to about 20 gsm. In one embodiment according to the invention, the coat weight may be in a range of about 21 gsm to about 50 gsm.

With reference to the heat sealer that may be used in conjunction with a heat sealable adhesive material, suitable heat sealers are commercially available. A suitable commercially available heat sealer is the P/N 772 HEAT SEALER—HANDHELD, which is commercially available from Clear-Pack Engineering, Inc. (Corona, Calif.). Another commercially available heat sealer is the HS-ll PORTABLE HEAT SEALER, which is commercially available from Huntsman, Inc. (Twin Falls, Id.). Other heat sealers are available, and can be selected to meet application specific criteria. If an embossing is to be performed, the heat sealer employed should have a desired texture on the contacting heat sealing element or platen. In one embodiment, radio frequency welding may be used in place of heat sealing techniques. Lap joint bonds, overlap bonds, crimping and other bond types can be formed using the described techniques and are suitable therewith.

The Print Layer

In one embodiment, the print layer 136 may be a print receptive and/or corona treated polyethylene film, for example, FASSON PE Top White 1S-100, which is commercially available from Avery Dennison Corporation (Pasadena, Calif.). The 1S-100 is a white polyethylene film with a print receptive coating. Alternative suitable films include transparent one-side-top-coated biaxially oriented polypropylene (BOPP) film, pearlescent corona treated polyester film, white calandered polyvinyl chloride (PVC) film that has been monomerically plasticized to have a glossy appearance, and white semi-gloss, co-extruded expanded polystyrene (PS) film with a transparent PS skin layer. The print layer 136 can support graphics, text and like thereon.

When applied, the ink composition can contain greater than 50% solids, in one embodiment greater than 75% solids, and in one embodiment greater than 85% solids. In one embodiment, the ink composition may be 100% solids and may be an ultraviolet radiation (UV) curable ink. Useful UV curable inks generally include one or more photopolymerizable monomeric binder materials and should contain at least one photoinitiator. Useful binder materials and photoinitiators are substantially the same as the UV curable monomers and photoinitiators disclosed hereinabove.

In addition to the above described binder materials and photoinitiators, the UV curable inks suitable for use with at least this embodiment can contain at least one colorant selected from: inorganic pigments; body pigments; opacifiers; holographic, magnetic, magnetizable, metallic or retroreflective flakes, fibers or whiskers; dyes; prismatic, retroreflective or radiation-absorbent crystals; and reflective, fluorescent, pearlescent, organic pigments, such as proteins or peptides, and the like, all of which are commercially available. Examples of useful inorganic pigments include titanium dioxide, cadmium yellow, cadmium red, cadmium maroon, black iron oxide, chrome green, and powders and flakes of such metals as gold, silver, aluminum and copper, and oxides and alloys thereof. Examples of dyes include alizarine red, Prussion blue, auramin naphthol, malachite green, and commercially interchangeable alternatives. Useful concentrations of the colorant can be in a range of from about 0.01 weight percent to about 100 weight percent by weight (based on the composition total weight). In one embodiment, the concentration of the colorant may be in a range of from about one weight percent to about 50 weight percent, and in one embodiment the colorant may be in a range of from about 51 weight percent to about 99 weight percent.

The ink composition may also contain at least one UV absorber that provides weathering protection and helps prevent micro-cracking of the color image. If present, the amount of UV absorber included in the UV radiation curable ink should be maintained at a practical minimum since the presence of the UV absorber may sometimes increase the curing rate to an undesirable level. A variety of UV absorbers useful in the present invention are commercially available. These UV absorbers include those belonging to the group of photopolymerizable hydroxyl benzophenones and photopolymerizable benzo triazoles. U.S. Pat. No. 5,369,140 describes a class of 2-hydroxyphenyl-s-triazines that may be useful as UV absorbers for radiation curable systems, the disclosure of which is hereby incorporated by reference. Triazines may be effective for extending the stabilization of cured films that are exposed to sunlight, and these stabilizers do not generally interfere with UV radiation curing of the inks. The triazine UV absorbers may be effective in amounts of from about 0.1 weight percent to about 2 weight percent based on the composition total weight. The UV absorbers may be used in combination with other light stabilizers, such as sterically hindered amines. U.S. Pat. Nos. 5,559,163 and 5,162,390 describe other useful UV absorbers, the disclosures of which are hereby incorporated by reference. Naturally, in alternative embodiments according to the present invention that desire that the confidential information be UV transparent, such UV absorbers generally are not present.

In addition to additives being present in the facestock 132, additives may also be present in the adhesive materials used to form the adhesive layer 134, and in other layers, such as intermediate layers, skin layers, print layers, and the like. For example, it may be possible to use UV curing to achieve a suitable tack for the pressure sensitive adhesive stage. If UV curing is desired, a UV initiator may be used. For example, a useful UV initiator includes a blend of monoacylphosphine oxide, oligo-(2-hydroxy-2-methyl-1-4 (1-methylvinyl)phenyl propanone, trimethyl benzophenone, and methylbenzophenone.

In one embodiment, the adhesive layer 134 includes photo-polymerizable or UV curable monomers to form the adhesive layer 134. Exposure to UV light polymerizes the monomers into a polymerized permanent adhesive. Thus, the sealing technique requires a UV light source.

The UV curable monomers can be ethylenically unsaturated compounds containing one or more olefinic double bonds, and may be low molecular weight compounds (monomeric) or high molecular weight compounds (oligomeric). Illustrative examples of monomers containing a double bond are acrylates such as alkyl (meth) acrylates or hydroxyalkyl (meth) acrylates such as methyl-, ethyl-, butyl-, 2-ethylhexyl- or 2-hydroxyethylacrylate, iso-bornylacrylate, and methyl- or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride and vinylidene chloride. Exemplary UV curable monomers containing a double bond include diacrylates of ethylene glycol, 1,3-propylene glycol, 1,4-butaneodiol, 1,4-cyclohexane diol, neopentyl glycol, hexamethylene glycol, or bisphenol-A polyacrylates such as trimethylol propane triacrylate and pentaerythritol triacrylate or tetraacrylate, vinyl acrylate, divinyl benzene, divinyl succinate, diallyl phthalate, triallylphosphate, triallylisocyanurate and tris (2-acryloyloxy) ethyl-isocyanurate.

Examples of high molecular weight (oligomeric) polyunsaturated compounds include acrylated epoxy resins, acrylated polyethers, acrylated polyurethanes or acrylated polyesters. Further examples of unsaturated oligomers include unsaturated polyester resins, which are normally prepared from maleic acid, phthalic acid, and one or more diols, and which have molecular weights in a range of from about 500 to about 3000. Such unsaturated oligomers can be referred to as prepolymers. Single component systems based on photocurable prepolymers can be used as a binder material.

Unsaturated compounds also can be used in admixture with non-photopolymerizable film-forming components. These components may be chemically curable or thermocurable resins, such as polyisocyanates, polyepoxides or melamine resins. Reference may be made in selecting thermocurable resins to the use temperatures of heat activated or hot melt adhesives if such are to be used in the manufacturing process.

When UV curable monomers are selected for use in adhesive layer 134, at least one photoinitiator may be included. Many photoinitiators are commercially available for UV radiation curable systems. Suitable photoinitiators include those that undergo a unimolecular bond cleavage upon irradiation to yield free radicals, for example, benzophenone and benzophenone derivatives, benzoin ethers and esters, benzil ketals, dialkoxy acetophenones, hydroxyl acetophenones, amino acetophenones, halo acetophenones and amino alkyl, aceto and arylphosphine oxides. Other suitable types of photoinitiators include those that undergo a bimolecular reaction where the excited state of the photoinitiator interacts with a second molecule (i.e., a coinitiator) to generate free radicals, for example, amino benzophenones, amino thioxanthones, and titanocenes. Photoinitiators generally differ in that they have different absorption maxima. To cover a wide absorption range, it is possible to use a mixture of two or more photoinitiators. Useful amounts of photoinitiator in the UV radiation curable monomers are generally up to about 10 weight percent. In one embodiment, the amount may be in a range of from about 0.05 weight percent to about 7 weight percent. In one embodiment, the monomers contain an amount in a range of from about 0.2 weight percent to about 5 weight percent.

Amines and/or amino groups may be added to accelerate the photopolymerization. Useful amines include, for example, triethanolamine (TEA), N-methyl-diethanolamine (mDEA), p-dimethyl aminobenzoate and Michler's ketone. The photopolymerization can be accelerated further by the addition of a photosensitiser, which can displace or broaden spectral sensitivity. Useful photosensitizers include aromatic carbonyl compounds such as thioxanthone, anthraquinone and 3-acyl-coumarin derivatives as well as 3-(aroylmethylene)-thiazolines.

Hindered amine light stabilizers (HALS) which function as co-stabilizers, also may be added to the UV radiation curable printing compositions used in the present invention. Examples of hindered amine light stabilizers include those listed and recited in U.S. Pat. Nos. 4,636,408 and 5,112,890, which are incorporated herein by reference. A specific example of a hindered amine light stabilizer is bis(1,2,2,6,6-pentamethyl-4-piperidinyl) sebacate, which is commercially available as TINUVIN 292 from Ciba-Geigy Specialty Chemicals, Inc. (McIntosh, Ala.).

The Embeddable Layer

The embeddable layer 138 defines a protective cavity for the monitor 150, for example, an RFID, and any necessary or desired circuitry such as leads that allow the monitor 150 to communicate with the pathway 144 and/or an antenna. The embeddable layer 138 may be a monolayer or may be multilayered. In one embodiment, the embeddable layer 138 may be multilayered and include a tie or adhesive layer; electrically conductive layer; dielectric layer; expandable layer; and overlaminate layer.

The embeddable layer's adhesive sub-layer includes an adhesive material. During preparation of the embeddable layer 138, the embeddable adhesive layer may be deposited on a silicone coated paper release liner. However, other commercially available release liners having releasable properties may be selected for use. The embeddable adhesive layer may be a UV curable pressure sensitive adhesive, which is commercially available from Avery Dennison Corporation (Pasadena, Calif.). This embeddable adhesive layer provides a tie layer for the various multiple layers of the embeddable layer 138.

The electrically conductive layer includes metallic conductive ink. The electrically conductive layer can be selectively deposited or printed onto the embeddable adhesive layer using silk screening, flexographic printing, electro deposition, hot stamping, etching, lamination, and the like. The metallic conductive ink can be deposited onto portions of the embeddable adhesive layer to define contact pads or electrical leads for attachment with the monitor 150. The electrically conductive layer can be printed as a specific pattern, for example, a spiral pattern defining an antenna.

The dielectric layer has a high dielectric constant and provides electrical insulation between other layers as desired. If multiple antenna or RFID chips are used, or if the conductive pathway 144 loops back over itself, or the like, then the dielectric layer can prevent or reduce shorting between electrically conductive pathways. In addition, the dielectric layer can be used to form a capacitor, and can be used to prevent or reduce unwanted electromagnetic radiation from outside contacting the RFID, or other electronic circuitry.

The expandable layer can include thermally expandable spacer ink. The expandable spacer includes a binder of a polymeric resin system and an expandable additive. A suitable additive can include thermoplastic hollow spheres encapsulating a gas or a blowing agent.

The additive can expand in response to applied heat. Suitable thermoplastic hollow spheres include EXPANCEL 551DU, which is commercially available from Expancel, Inc. (Duluth, Ga.). In alternative embodiments, blowing agents without spheres may be used. Suitable blowing agents include diazoaminobenzene; azobis (isobutyronitrile); dinitroso pentamethylene tetramine; N,N'-dinitroso-N,N'-dimethylterephthalamide; azodicarbonamide; sulfonyl hydrazides; benzene sulfonyl hydrazide; toluene sulfonyl hydrazide; oxybis(benzene sulfonyl hydrazide); sulfonyl carbazides; azodicarboxylic acid esters; and azodicarboxylic acid salts.

The polymeric resin system can include a resin and a solvent to provide a flexible vehicle which does not degrade upon expansion of the expandable additive. A suitable resin may be polyester. In alternative embodiments, the resin can be vinyl, ethylene vinyl acetate, acrylic, urethane, other olefin, and combinations. If used, suitable solvents include methyl ethyl ketone (MEK), toluene, cyclohexane, glycol ether, and the like.

Upon curing, the expandable layer foams to a thickness substantially equal to or greater than a thickness of the monitor 150. A pre-cured thickness of the expandable material may be sometimes less than half of the cured thickness of the expanded material.

The monitor 150 can have a thickness in a range of from about 0.25 millimeters (mm) to about 0.9 mm. Accordingly, the embeddable layer 138 should be selected to have a thickness at least equal to the thickness of the monitor 150, any cured expandable material thickness greater than the thickness of the monitor 150 should provide some protection to the monitor 150. And, the monitor 150 would not form an exposed bump on the finished article 100.

To effect electrical connection with the monitor 150, and when a non-expanding layer may be used, to circuits, the embeddable layer can undergo a controlled depth milling operation. The milling can define a volume for the monitor, and can expose one or more contact pads, which comprise part of the internal embedded electronic elements of the monitor 150. In alternative embodiments, one of the layers adjacent to the embeddable layer defines a pre-formed window which can be positioned over the contact pads prior to lamination or layer formation. A spacer can reduce or eliminate the flow of the layer-forming material into the window region so as not to coat the contact pads with layer-forming material during the manufacturing process.

In alternative embodiments, an overlaminate layer may be deposited on the expandable layer to provide an adhesive surface. A suitable overlaminate can be a film, such as a polyester, cellulose acetate, vinyl, polyethylene, polypropylene, styrene, or the like, mixed with an adhesive, such as an acrylic or rubber.

At surface of the expandable layer can be printed on using a printing press or similar printing apparatus, or the sheet of overlaminate film can be placed expandable layer and placed in a laminator. The expandable layer and overlaminate film may be heated and then cooled to form the embeddable layer.

The Embossable Layer

The embossable layer 140 may be physically embossable, holographically embossable, or magnetically embossable layer, or may be a combination of embossing types. For physically embossable embodiments, the embossable layer 140 can be formed from a heat responsive material. Suitable heat responsive materials include thermoplastic materials that soften at increased temperatures, but are relatively hard at ambient temperatures, and thermosetting materials that may be initially only partially cured and respond to heat by deforming and then curing into a non-deforming shape. Metallized foils and the like can be used to accept an embossment, and while they generally do not require heat to deform into a finished shape, such foils may not be adversely affected by the relatively elevated temperatures used to form a heat seal, if such is used. In addition, a thermochromic ink layer can be printed onto the embossable layer 140, or another layer of the article 100. The thermochromic ink layer can change colors to indicate that an authentic heat seal was used. Generally, a thermochromic ink with a very narrow color range vs. temperature may be used with a narrowly controllable heat sealing device. Also, the thermochromic ink layer can be frangible or combined with a frangible layer, thus increasing the difficulty for duplication or the undetected manipulation of the seal structure 130.

With reference to holographically embossable materials suitable for use with the present invention, an example includes LUMBRITE U6E which is commercially available from Toray Industries (America), Inc. (New York, N.Y.). LUMBRITE U6E is a directly embossable, biaxially-oriented, three-layer coextruded, coated polyester film, available in three gauges, 60, 92 and 200. The coating has a dry film thickness of about 0.5 micrometers. In alternative embodiments, the LUMBRITE U6E film is further coated with a patterned High Refractive Index coating, thus permitting the production of customizable holograms on demand.

Holographic embossing may be sometimes referred to as digital watermarking. Digital watermarking can be defined into at least two categories, robust and fragile. The embossable layer 140 of the present invention can accept robust, fragile, or both robust and fragile digital watermarks in alternative embodiments. A robust watermark is a watermark designed to be readable despite signal degradations caused by tampering with the seal that carries the watermark. A fragile watermark is one in which the watermark signal degrades or becomes unreadable as a result of seal tampering. In alternative embodiments according to the present invention having digitally watermarked holograms, seal tampering activities can include operations involved in reproducing the hologram, e.g., attempting to reproduce a surface relief pattern or embossing texture. The degradation of a fragile watermark can be measured by determining the decrease in the signal energy of the detected watermark relative to a predetermined threshold, or a comparison against a standard. The use of digital watermarking is disclosed in U.S. Pat. No. 6,608,911 to Digimarc Corporation, which is incorporated herein by reference in its entirety.

With reference to magnetic embossable materials suitable for use with the present invention, commercially available magnetizable films or inks may be employed. A predetermined magnetic imprint may be induced onto the magnetizable material, and the magnetic imprint may be read by a magnetic reader at a later time to determine if the magnetic imprint has been altered, destroyed or remains the same.

The Pathway

The pathway 144 is a structure that extends adjacent to the body portion 110, throughout the body portion 110, and/or throughout the first and second end portions 112, 114. The pathway 144 may conduct energy of a predetermined type. In one embodiment, the energy may be light from, for example, a light emitting diode (LED) or may be coherent light energy from a laser source. In one embodiment, the light energy can have a wavelength in a range of from about 850 nanometers (nm) to about 1550 nm. Commercially available LED light sources typically generate light having a wavelength closer to about 850 nm, while commercially available laser light sources typically generate light with a frequency closer to about 1550 nm. But, vertical cavity surface emitting lasers (VCSEL) typically generate light with a frequency closer to about 850 nm and also may be suited for use in the present embodiment.

In alternative embodiments, the energy may be electrical, heat, magnetic, other energy along the electromagnetic spectrum, or the like. The type of energy conducted can constrain the type of materials useful for forming the pathway. For example, in the illustrated embodiment, the energy may be light and the pathway may be an optical fiber or a bundle of like or dissimilar optical fibers. The fibers may be glass fibers, such as those commercially available from Corning Cable Systems LLC (Hickory, N.C.). In alternative embodiments the fibers can be polymeric or a combination of glass and polymeric fibers. Suitable polymeric fibers include those with a methyl methacrylate core with fluorinated polymer cladding such as RAYTELA brand fibers, which are commercially available from Toray Industries (America), Inc.

In one embodiment, the optical fibers form a ridged cable. That is, an exterior surface of a fiber optic cable has ridges to facilitate gripping in a holder. The holder can be a single use or reusable holder. An example of a holder may be the body portion 110 shown in FIGS. 1–4. For reusable applications, the holder can define an elongate aperture through which subsequent replacement fiber optic bundles or cables can be inserted. Thus, for ridged cable embodiments, the ridges would engage the inner surface that defines the elongate aperture and mechanically secure the cable in place. In one embodiment, the ridges may be angled and allow movement of the cable relative to the aperture-defining inner surface in one direction only. In one embodiment, the optical fibers have attachments on an end of each fiber, or on the end of the cable if bundled. The attachments prevent a fiber or cable from being regarding-inserted into the holder once the fiber or cable has been removed from the holder.

As a further illustration of a suitable alternative pathway in accordance with the invention, the pathway can be electrically conductive, or semi-conductive if the energy may be electrical energy. In particular, the pathway can be an electrically conductive ink printed onto a supporting layer, a layer of electrically conductive polymer, a layer of polymer doped or filled with electrically conductive filler material (e.g., nickel flake, carbon powder, and metallic fibers), a metal foil, and the like. Suitable electrically conductive inks are commercially available from DuPont Electronic Materials, Inc. (Wilmington, Del.).

An electrically conductive pathway comprising metal can be produced by, for example, chemical vapor deposition (CVD), sputtering coating, and printing with the metallic ink. Suitable metals for use in an electrically conductive pathway include titanium, silver, gold, aluminum, copper, iron, and alloys of these metals.

In one embodiment, the facestock 134, or other layer adjacent to the pathway 144, has a relatively high dielectric constant or may be electrically insulative. The dielectric material or film can be selected and arranged to insulate conductive pathways if there are more than one pathways, or if the pathway may be configured to loop over itself. Further, the dielectric film can be selected and adapted to provide an insulating layer to create a capacitance between conductive layers. The capacitance can be used as a power source, or as a device to build up energy to create a burst power source, for example, to transmit a signal to an associated sensor.

The term "tamper" and its derivative forms are used herein to refer to complete or partial removal of the article 100 from an item to which it has been secured. Complete or partial removal includes bending, breaking and/or stretching above a predetermined threshold level. Tamper and its derivative forms are together referred to as manipulation. But, manipulation excludes normal handling movements. The threshold level for what may be and may be not considered to be manipulation can be selected with reference to application specific parameters, such as degree of handling that may be expected during use, the nature and condition of the handling, the degree of security desired, and the like. As an example, in an application where no unauthorized movement may be expected a very low threshold of bending or stretching could be used, the threshold could approach zero in some situations. Alternatively, in situations where the article 100 can be subjected to rough handling for a prolonged period, a very high threshold can be used, for example, an actual break in the pathway 144 may be required to indicated that tampering has happened or may be happening.

The Monitor

In one embodiment, the monitor 150 may be a radio frequency identification device (RFID) embedded in the embeddable layer 138. In one embodiment, the RFID may be capable of interacting passively, and in other embodiments the RFID may be actively interactive with an RFID sensor located remote from the RFID. In addition, the RFID can include one or many optional components. Such optional components include an antenna, a memory chip, a power source, a receiver, a transmitter, a transponder, a light-to-electricity converter, integrated circuit. In one embodiment, other commercially available wireless communication devices may be used to communicate with an associated sensor, either actively or passively. Such alternative wireless communication devices include Bluetooth enabled devices, as well as other devices that utilize non-radio frequency electromagnetic energy.

With reference to the antenna, various configurations may be possible for the antenna. In one embodiment, the antenna includes a plurality of distinct, separate antennas. One antenna may be provided for receiver functions and another antenna may be provided for transmitter functions. In one embodiment, a single antenna may be shared and functions as both the receiver and transmitter, or transponder. In one embodiment, the antenna may be defined by conductive epoxy screen printed or flexographically printed onto a flexible insert. The antenna may be conductively bonded to the RFID via bonding pads.

In an embodiment where a single antenna may be employed, that single antenna can include a folded dipole antenna defining a continuous conductive path, or loop, of microstrip. Alternatively, the antenna can be constructed as a continuous loop antenna.

For RFIDs that actively interact, they may include a power source. In one embodiment, the power source may be a battery. If the power source is a battery, the battery can take any suitable form. Factors that can be considered in pre-selecting the battery type include the weight, size, flexibility, power output, and life requirements for a particular application. In one embodiment, the battery may be a thin profile button-type cell forming a small, thin energy cell commonly utilized in watches and small electronic devices requiring a thin profile. A conventional button-type cell has a pair of electrodes, an anode formed by one face and a cathode formed by an opposite face. In one embodiment, the battery includes, in series, connected pairs of button type cells. In one embodiment, the battery is a flexible polymeric battery.

In one embodiment, the RFID transmits and receives radio frequency communications to and from the RFID sensor. The RFID sensor can include an antenna and dedicated transmitting and receiving circuitry, similar to that implemented on the RFID. One example of an RFID sensor implemented in combination with a transponder unit may be disclosed in U.S. Pat. No. 4,857,893, which is hereby incorporated by reference. The RFID can include one or more receivers. If more than one receiver is used, one can be a low power receiver for detecting a wake up signal from an RFID sensor, and another can be a high power receiver for receiving commands from an RFID sensor. The antenna may be constructed and arranged to form a folded dipole antenna that may be the dual-function continuous conductive path 144 or a loop as shown in FIG. 4. Terminal ends of the antenna form conductive leads that electrically interconnect with the RFID of FIG. 4.

In one embodiment, the monitor 150 may be a flip chip having a memory and may be electrically connectable using commercially available chip attachment methods. For example, the monitor 150 can be electrically attached using a conductive adhesive, such as a polymeric conductive adhesive or an anisotropic conductive adhesive, which may be dispensed using a needle and syringe.

Figure 6:
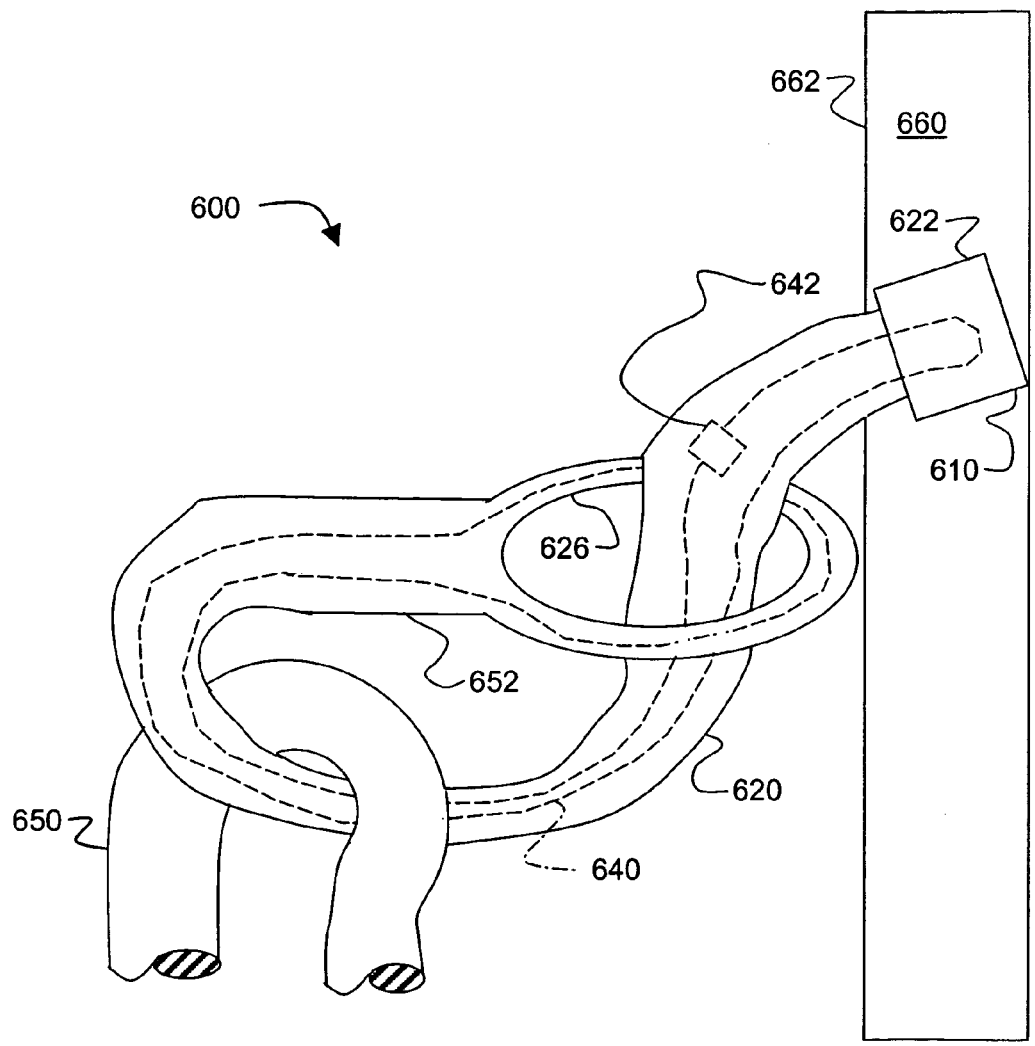

Many of the embodiments discussed above can be adapted into security systems of differing application. A tamper resisting, monitoring and evidencing article 600 is shown in FIG. 6. The article 600 may be substantially similar to the article 100 shown in FIG. 1. But, rather than implementing the article 600 as a loop having end portions 112, 114 that attach to each other, the article 600 has a single attachment pad 610 integrally formed with a body portion 620. The body portion 620 has the attachment pad 610 disposed at a first end 622. The body portion 620 defines an aperture 626 at a second, distal end 628 spaced from the first end 622. The aperture 626 may be sized so that the attachment pad 620 can be threaded therethrough.

A conductive pathway 640 may be embedded within the article 600, and so is shown in dashed lines. The pathway 640 forms a continuous loop that extends along the length of the body portion 620 and the pad 610. The pathway loop also extends around a perimeter of the aperture 626. A monitor 642 that may be substantially similar to the monitor 150 shown in FIG. 4, may be disposed along the pathway 640 and may be in communication therewith. The body portion 620 has a reduced stretch or tear strength relative to the adhesive strength of the pad 610.

The body portion 620 will stretch, bend, flex, break, tear or the like prior to the pad 610 releasing from a surface to which it has been adhesively bound. The conductive path 640 may be friable or frangible in response to stretching, bending, flexing, breaking, tearing or the like of the body portion 620. By breaking, the conductive pathway 640 can indicate to the monitor 642 that the pathway 640 has been tampered with. The monitor 642 can then report the tampering to a receiving station that communicates with the monitor 642, for example, by using radio waves.

During use, the first end 622 may be wrapped through an item 650 (shown with a portion cutaway) and pushed through the aperture 626 to form a loop 652. The pad 610 may be then secured to a surface 660 of a difficult or impossible to move object 662, for example, a wall. The pad 610 may be secured in place by contacting an impulse heat sealer having an embossed platen, such as a heat sealer described hereinabove, to the pad 610 while the pad 610 may be in contact with the object surface 660. The heat sealer heat seals the pad 610 to the object surface 660, thus securing the pad 610 thereto.

The item 650 may be then sealed and secured to the object 662. Attempts to tamper with and remove the item 650 result in a manipulation, such as stretching, bending, flexing, breaking, tearing or the like, of the body portion 620. The manipulation of the body portion 620 affects the conductive path 640, which may be detected by the monitor 642. In response, the monitor 642 communicates the manipulation or tampering event to the station.

Figure 7:
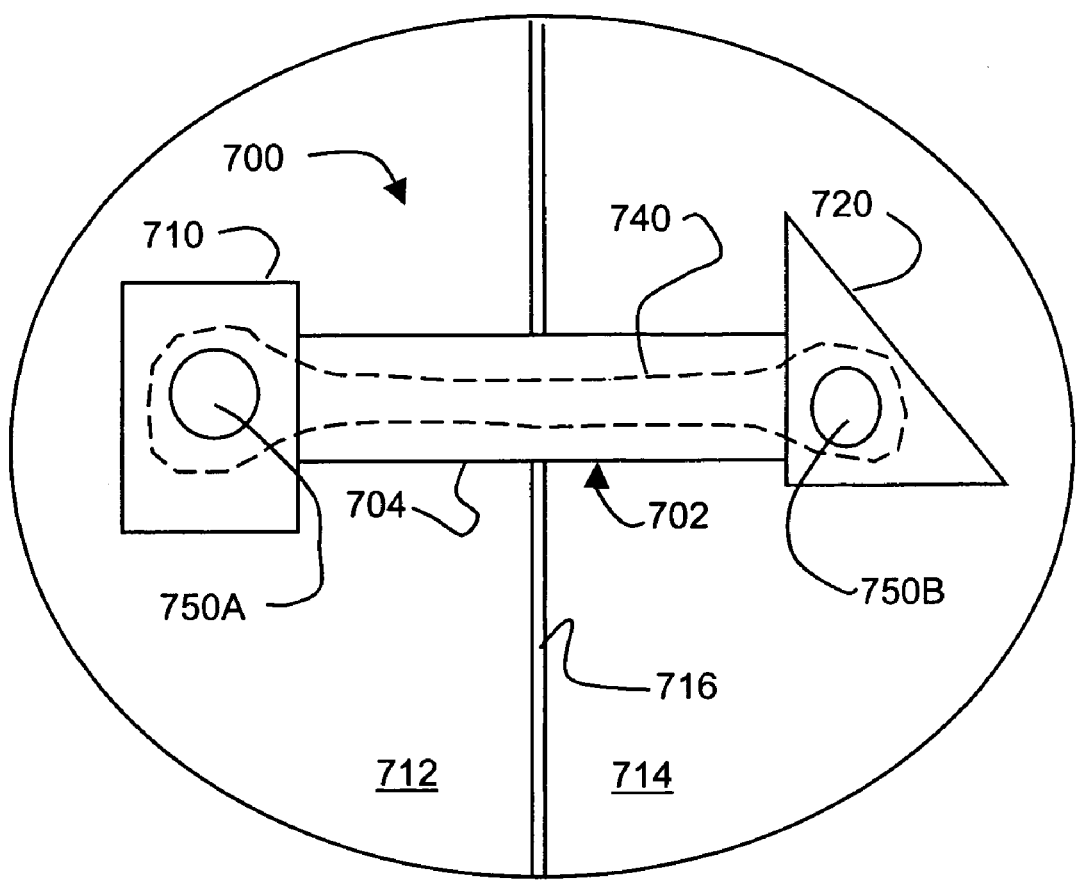

With reference to FIG. 7, a securing system 700 includes an article 702 that may be substantially similar to the article 100 shown in FIG. 1. Rather than implementing the article 700 as a loop having ends that attach to each other, the article 702 may be strap-shaped and does not form a loop with ends attached to each other.

Specifically, the article 700 has a thin elongate body portion 704, a first end portion 710 that can attach to a door 712, or other movable element, and a second end portion 720 that can attach to a wall 714 or other non-moving element, or to a second moving element, adjacent to the door 712. Thus, opening the door 712 moves the first end portion 710 further apart from the second end portion 720. In the illustrated embodiment, the first and second end portions 710, 720 may be sized and shaped different from each other, while in alternative embodiments end portions may be of the same size and/or shape. In particular, the first end portion 710 has a substantially rectangular top profile, while the second end portion 720 has a substantially triangular top profile. In alternative embodiments, end portions may have top profiles defining other geometric or asymmetric shapes, and may have side profiles that may be substantially non-planar or may be flat. Profiles may be selected to address application specific criteria, such as substrate surface contours, textures, configurations, and the like. In yet other alternative embodiments, the size and shape of the end portions differ relative to each other, the components of the end portions differ relative to each other, and the size and shape of the end portions differ relative to the body portion 704. The attributes of the components themselves can be selected with reference to application specific criteria, such as the length of the body portion 704 being elongated to space the end portions 710, 720 further from each other.

The article 700 also includes a continuous conductive pathway 740 that may be substantially similar to the conductive pathway 144 shown in FIG. 4. In this embodiment, the pathway 740 defines or forms a simple loop. In alternative embodiments, the pathway defines complex patterns, such as weaves, knits, meshes, and the like in both two and three-dimensional patterns. While not required, at least one portion of the pathway can extend around one or more sealing structures. In the illustrated embodiment, there is a first sealing structure 750A disposed in the first end portion 710, and a substantially similar second sealing portion 750B disposed in the second end portion 720.

The sealing structures 750A, 750B may be substantially similar to the sealing structure 130 shown in FIGS. 1–4. Generally, the sealing structures 750A, 750B include a hot melt adhesive on a contact side of the respective end portion and may be operable to secure the article 700 to a substrate surface using a heat source, such as a heat sealing device. The strength of the adhesion may be selected to be greater than or increased relative to, for example, the fracture or tear strength of the pathway 740. In alternative embodiments, the adhesives differ, the adhesive strength of the adhesives differ, the ratio of the adhesive strength to various attributes of the pathway 740 differs, and/or the ratio of the adhesive strength to various attributes of facestock or other component of the body portion 704 differs.

During use, the first end portion 710 may be secured to the door 712 by pressing a heated, embossed platen against an outer surface of the first end portion 710. The second end portion 720 may be secured to the wall 714 by the same or a different method as the first end portion 710. Attaching the article 700 to span between an entry/exit door and the framework supporting the door, unauthorized entry through the door can now be monitored.

Figure 8:
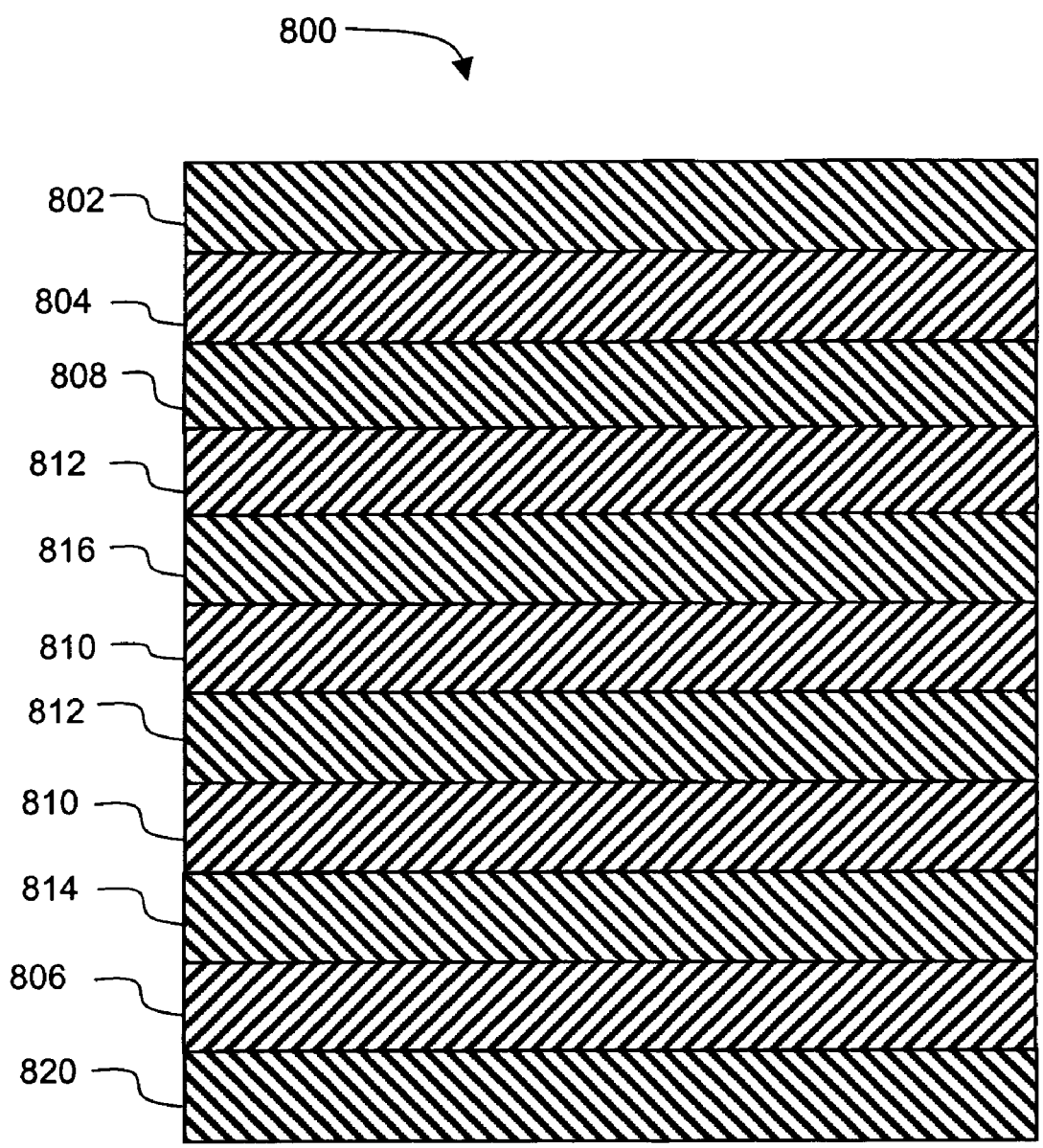
FIG. 8 is a schematic diagram showing a cross-sectional view of a portion of an article comprising alternative embodiments in accordance with the invention.
Figure 9:
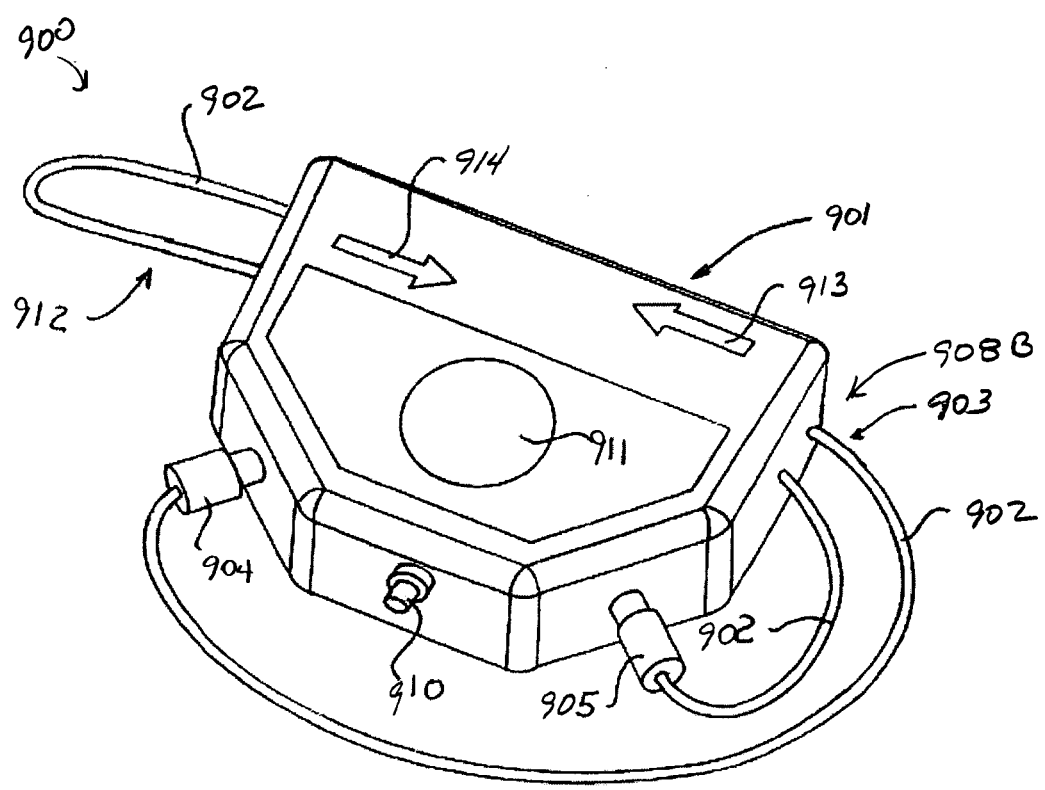
FIG. 9 is an oblique view of another embodiment tamper resistance device in accordance with the present invention.

An article 800 comprising an additional embodiment of the present invention is shown in FIG. 8. The article 800 may be substantially similar to the embodiment 100 shown in FIGS. 1–4, except that alternative and/or additional layers may be used with or without the layers already identified and in a differing order of the layers relative to each other.

In particular, the article 800 may be a multi-layered film or composite that includes a frangible material layer 802, such as P-5 DESTRUX, which is commercially available from Avery Dennison Corporation (Pasadena, Calif.), and which can be combined with an optional top printed graphics using ink compositions described hereinabove; a facestock layer 804 formed of facestock materials such as a 2 mil thick clear BOPP film; an adhesive layer 806 formed of adhesive materials such as a 1 mil thick layer of N720 heat seal adhesive; an optional printed graphics layer 808 that would remain even if the frangible material layer 802 has graphics that may be destroyed by tampering; an optional de-laminatable multi-layer 810, which may be coextruded with tie layers 812, and which will preferentially delaminate between film layers because an adjacent tie layers 812 have a greater adhesive strength relative to the interlayer bond strength of the de-laminatable layer 810; a substantially clear or transparent layer 814 that may be responsive to distortion by changing from transparent to opaque; an optional organic light emitting diode (OLED) or organic thin film transistor (TFT) imaging layer 816; and, an optional second de-laminatable or frangible layer 820 that may be the same or different than other de-laminatable or frangible layers in the article 800.

The arrangement of the layers in article 800 can be changed to accommodate multiple layers (such as multiple frangible layers being disposed apart from each other) and to allow the function of a particular layer to be viable (such as a transparent top layer overcoating a printed graphics layer, where an opaque top layer might preclude viewing an overcoated printed graphics layer thus rendering the graphics layer superfluous). Naturally, there may be some constraints on the arrangement of the layers, for example, the adhesive layer 806 generally will be at a peripheral surface to allow the adhesive layer 806 to secure to another surface during use. But, if an optional release liner 820 may be used to protect or cover the adhesive layer 806, then for at least some portion of time, the adhesive layer 806 would not be a layer defining a peripheral surface. Thus, the presence and arrangement of the layers of the article 800 can be selected with reference to the characteristics of each layer and the desired application for the article 800. The layers shown can be arranged in any logical order with reference to application specific criteria and the particular properties of the layers.

The imaging layer 816 can be grey scale or color and may be about 300 micrometers thick or less. The imaging layer 816 may be flexible and can project static images and/or dynamic video. A suitable matrix may be polyimide polymer that can support conductive ink. The imaging layer 816 communicates with a controller (not shown), which also communicates with a monitor (not shown). The monitor may be substantially similar to the monitor 642 shown in FIG. 6. If the monitor detects tampering it can respond by actively or passively signaling the occurrence of the tampering to a monitoring station similar to the process described hereinabove, but the monitor of this embodiment can also signal to the controller. The controller can respond to the monitor's signal by causing the imaging layer 816 to change appearance.

For example, a controller can cause the imaging layer 816 to display the static image in blue type of "SECURED" until signaled by the monitor. Then the controller can cause the imaging layer 816 to display a dynamic image in red type of "NOT-SECURED". Naturally, other words, images, colors, patterns and the like can be used, conversely, the controller can display an image until signaled by the monitor and in response can stop displaying any image at all. Alternatively, the controller can maintain the imaging layer 816 as opaque to block the view of a message printed on a layer beneath the imaging layer 816 until signaled by the monitor, and then the controller can respond by allowing the imaging layer 816 to return to a low or no-power transparent state such that the image may be viewable through the now-transparent imaging layer 816.

FIGS. 9–12 show another embodiment, a tamper-resistant article or device 900 that includes a monitor housing 901, and a security strap 902 attached to the monitor housing 901. The security strap 902 loops around an item for which security is desired, passes twice through the body of the monitor housing 901 (as seen at 903), and connects at its opposite ends to transmission and receiver couplings 904 and 905 of the monitor housing 901. The monitor housing 901 includes various components for monitoring the integrity of the strap 902 and for reporting to a separate reader whether the strap 902, and the item to which it is attached, has been tampered with. Thus the monitor housing 901 may include components of a monitor similar to the monitor 150 (FIG. 4) described above.

Figure 10:
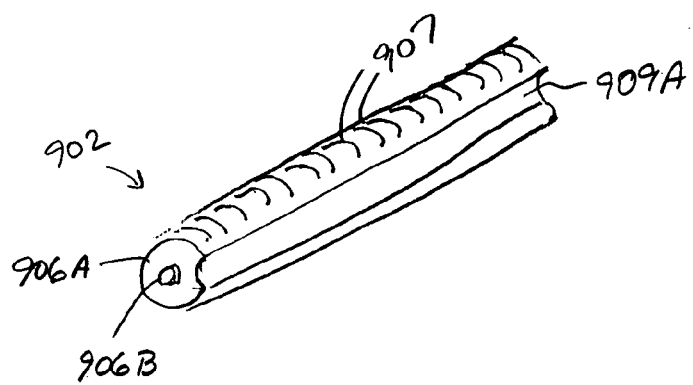
FIG. 10 is an oblique view of a security strap that is part of the device of FIG. 9.
Figure 11:
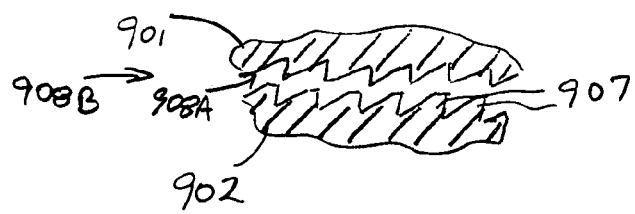
FIG. 11 is a sectional view illustrating an aspect of the engagement of the security strap and the monitor body of the device of FIG. 9.
Figure 12:
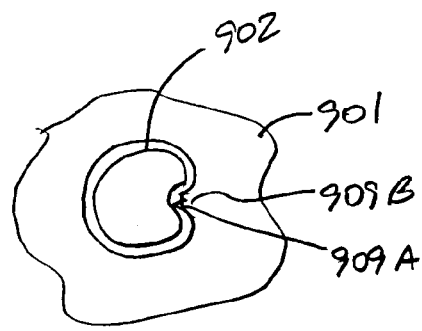
FIG. 12 is an end view illustrating another aspect of the engagement of the security strap and the monitor body of the device of FIG. 9.

With reference to FIGS. 10 and 11, the security strap 902 may have a plastic outer covering 906A extruded around an optical fiber 906B in a concentric fashion. The optical fiber 906B extends to the ends of the strap 902, and may be exposed for connection to the couplings 904 and 905. The outer covering 906A of the security strap 902 includes a series of angled, transverse grooves, ridges, or protrusions 907 that interact with interior surfaces 908A of openings 908B in the monitor housing 901, such that the strap 902 can be inserted into and pass through the housing 901 in one direction, but cannot be pulled back though the housing 901. The ridges 907 may extend only part of the way around the circumference of the outer covering 906A, or may alternatively extend substantially all of the way around the circumference of the outer covering 906A.

The outer covering 906A has an axial groove 909A ensures that the strap 902 passes through the monitor housing 901 in the correct direction so that the device can be securely locked around the item to be monitored for evidence of tampering. The monitor housing 901 may include a suitably-shaped protrusion 909B, illustrated in FIG. 12, that engages the axial groove 909A when the strap 902 is properly inserted into the openings 908B of the monitor housing 901.

In addition to the optical transmission and receiver couplings 904 and 905 to which the optical strap 902 is connected to the monitor housing 901, the monitor housing 901 houses a radio-frequency identification (RFID) transmitter, a radio antenna, a battery, a tamper detecting circuit and a locking device for engaging the security strap and permitting it to pass through the housing in only one direction. The RFID transmitter, antenna and operational code can be used only to transmit signals as the RFID transmitter lacks the components to function as a transceiver. The monitor housing 901 may additionally include an LED indicator lamp 910 to provide a visual indication of the state of the security strap device 902. The monitor housing 901 may also include a contact memory button 911 which may be configured to provide information to authorized users regarding the item that is being protected.

To secure an item with the tamper evident device 900, one end of the security strap 902 is attached to the optical connector 904 and the free end is fed though an opening in the monitor housing 901 in the direction of the arrow 913. At the other end of the housing the free end of the security strap 902 is looped through the closure members, such as handles, of the item to be protected forming a loop 912. The free end is then fed back through the monitor housing 901 in the direction of the arrow 914. Because the security strap 902 can slide through the monitor housing 901 only in the direction of the arrows 913 and 914, the loop 912 may be tightened or cinched around the closure members of the item to be protected. The transverse ridges or grooves 907 of the security strap's outer coating or covering 906A interact with the monitor housing 901 to prevent the security strap 902 from being pulled through the monitor housing 901 in directions opposite to the arrows 913 and 914. This maintains the loop 912 tightened or cinched around the secured object. This prevents the protected item from being opened or otherwise tampered with without severing the security strap 902, and optical fiber 906B therein. The monitor housing 901 may be attached to the item being monitored at some location, such as through a pressure sensitive adhesive tape, to prevent undue stress on the security strap 902 so as to minimize the risk of false alarms.

An optical key may then be inserted into the optical receiver coupling 905 to "arm" the device, and the free end of the security strap 902 is connected to the optical coupling 905, completing an optical path from the transmission coupling 904, through the monitor housing 901, around the loop 912 which is secured to the protected item, and back through the monitor housing 901 to the receiving coupling 905. As such, an optical signal transmitted from the optical transmission coupling 904 should return to the optical receiving coupling 905 through the optical fiber 906B of the security strap 902 provided that the strap 902 has not been disturbed.

In normal operation, an optical signal is transmitted through the security strap 902 every fifteen seconds to ascertain whether the security strap has been disturbed. If the optical signal is successfully returned, a tamper detecting circuit will communicate the successful test to the RFID transmitter, which will transmit an appropriate radio-frequency signal through the antenna to the remote reader to indicate the integrity of the item being monitored. If the optical signal is not properly returned during one of the fifteen second monitoring intervals, indicating that the security strap has been severed or so significantly distressed to create a discontinuity in the optical fiber, the tamper detecting circuit will inform the RFID transmitter and the RFID transmitter will begin transmitting a radio-frequency alarm signal to the remote reader three times per second. The state of the tamper evident device will also be visually indicated through the LED indicator lamp.

After use, the security strap 902 can be severed where it is looped around the item to be monitored, and removed from the item. The severed security strap 902 is then pulled through the monitor housing 901 and removed from the optical couplings 904 and 905, and discarded. The monitor housing 901 is reusable with a new security strap 902.

The security strap 902 described above relies on the optical fiber 906B for making a pathway around at least a portion of the protected item. It will be appreciated that other suitable mechanisms, such as other suitable data-carrying media, may be used for making the pathway around the protected item. For instance, an electrically conductive path may be used instead of an optical path, with the optical fiber 906B replaced by an electrically conductive material such as a wire.

It will be appreciated that other mechanisms may be utilized to mechanically secure the security strap 902 within the openings 908B of the monitor housing 901. As one example, the monitor housing 901 may have resilient protrusions that protrude into the openings 908B to grip or bite into the security strap 902 when the security strap 902 is inserted into the openings 908B. The resilient protrusions may be angled in orientation relative to the openings 908B to allow the security strap 902 to be moved through the openings 908B in a preferred direction, while inhibiting or preventing movement of the security strap 902 through the openings 908B in the opposite direction. The resilient protrusions may have gripping surfaces or sharp edges configured to bite into or grip the outer covering 906A of the security strap 902.

As another example, the monitor housing 901 and/or the security strap 902 may have protrusions that would be broken off by movement of the security strap 902 through the openings 908B in a direction that would loosen the loop 912. A further alternative for securing the security strap 902 is to place coiled material within the openings 908B. The coiled material may be configured to allow insertion of the security strap 902 in one direction. However, attempting to remove security strap 902 by pulling it in the opposite direction causes the coiled material to bunch up and bind against the security strap 902. The principle employed is similar to that of "finger trap" tricks used by magicians.

The processes and embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

The invention claimed is:

1. A tamper monitoring article, comprising:
   an elongate body portion having a first end portion and a second end portion, the first end portion being adherable to the second end portion or to a substrate;
   a pathway structure extending along the body portion that is responsive to manipulation by indicating that manipulation has occurred, whereby the article can be secured to the substrate and can indicate whether the body portion has been manipulated; and
   an embossable layer disposed on or in the first end portion;
   wherein the embossable layer is physically embossable, the embossable layer is responsive to pressure from a sealer surface by conforming to a texture of the sealer surface, whereby the embossable layer has a corresponding texture after contact with the sealer surface; and
   wherein the embossable layer campuses a thermochromic ink that responds to the heat present in a heat sealing operation by changing colors, opacity, conductivity, or like property.

2. The article as defined in claim 1, wherein the corresponding texture on the embossable layer forms a pattern that is difficult to replicate.

3. A tamper monitoring article, comprising:
   an elongate body portion having a first end portion and a second end portion, the first end portion being adherable to the second end portion or to a substrate;
   a pathway structure extending along the body portion that is responsive to manipulation by indicating that manipulation has occurred, whereby the article can be secured to the substrate and can indicate whether the body portion has been manipulated; and
   an embossable layer disposed on or in the first end portion;
   wherein the embossable layer is magnetically embossable.

4. A system for monitoring tampering, comprising:
   a body portion configured to secure to an item to be monitored for tampering and having a free end portion, the end portion comprising a plurality of layers that are substantially adjacent to each other to define a multi-layer composite,
   the plurality of layers comprising:
   a facestock layer,
   an adhesive layer supported on the facestock layer comprising a heat seal adhesive or a heat activatable adhesive, and
   a frangible layer, embeddable layer or a de-laminatable layer supported on the facestock layer.

5. The system as defined in claim 4, wherein the embeddable layer supports a monitoring subsystem comprising a conductive pathway structure and an RFID in communication with the pathway structure.

6. The system as defined in claim 4, wherein the frangible layer responds to manipulation of the body portion by changing appearance or properties.

7. The system as defined in claim 4, wherein the de-laminatable layer comprises two coextruded colored layers that are substantially adjacent to and coextensive with each other along an inner surface, and two adhesive tie layers, wherein each tie layer is substantially adjacent to and coextensive with a respective one of the colored layers, and the tie layers have an adhesive strength that is increased relative to an inter-laminar strength of the colored layers.

8. A security strap comprising:
a data-carrying medium;
an outer coating encircling the data-carrying medium;
wherein the coating has plural transverse ridges protruding therefrom; and
wherein the data-carrying medium and the coating are co-extruded in a concentric fashion.

9. The strap of claim 8, wherein the ridges are angled ridges.

10. The strap of claim 9, wherein the ridges are configured to engage a surface, to prevent relative motion of the strap and the surface in one direction.

11. The strap of claim 8, wherein the coating has an axial groove therein.

12. The strap of claim 11, wherein the axial grove is configured to engage a protrusion from an opening.

13. The strap of claim 11, wherein the ridges are located substantially symmetrically relative to the axial groove.

14. The strap of claim 11, wherein each of the ridges extends part of the way around the coating.

15. The strap of claim 11, wherein the data-carrying medium is an optical fiber.

16. The strap of claim 15, wherein ends of the optical fiber are exposed for connection to optical couplings.

17. The strap of claim 15, wherein the outer coating is a plastic coating.

18. The strap of claim 17, wherein the optical fiber has a substantially circular cross-section shape.

19. The strap of claim 8, wherein the data-carrying medium is an optical fiber.

20. The strap of claim 19, wherein ends of the optical fiber are exposed for connection to optical couplings.

21. The strap of claim 20, in combination with the optical couplings coupled to the ends of the optical fiber.

22. The strap of claim 8, wherein the data-carrying medium is a conductive material.

23. The strap of claim 8, wherein the outer coating is a plastic coating.

24. The strap of claim 8, wherein the data-carrying medium has a substantially circular cross-section shape.

25. A security strap comprising:
a data-carrying medium;
an outer coating encircling the data-carrying medium;
wherein the coating has plural transverse ridges protruding therefrom;
wherein the coating has an axial groove therein; and
wherein the ridges are located asymmetrically relative to the axial groove.

26. The strap of claim 25, wherein the ridges are angled ridges.

27. The strap of claim 25, wherein the data-carrying medium is an optical fiber.

28. The strap of claim 27, in combination with optical couplings coupled to ends of the optical fiber.

29. The strap of claim 25, wherein the data-carrying medium is a conductive material.

30. The strap of claim 25, wherein the outer coating is a plastic coating.

31. A security strap comprising:
a data-carrying medium;
an outer coating encircling the data-carrying medium;
wherein the coating has plural transverse ridges protruding therefrom;
wherein the coating has an axial groove therein; and
wherein each of the ridges extends substantially all of the way around the coating.

32. A security strap comprising:
a data-carrying medium;
an outer coating encircling the data-carrying medium;
wherein the coating has plural transverse ridges protruding therefrom;
wherein the coating has an axial groove therein; and
wherein the ridges are substantially perpendicular to the axial groove.

33. The strap of claim 32, wherein the ridges are angled ridges.

34. The strap of claim 32, wherein the data-carrying medium is an optical fiber.

35. The strap of claim 34, in combination with optical couplings coupled to ends of the optical fiber.

36. The strap of claim 32, wherein the data-carrying medium is a conductive material.

37. The strap of claim 32, wherein the outer coating is a plastic coating.

38. A security strap comprising:
an optical fiber having a substantially circular cross-section shape; and
a coating encircling the optical fiber;
wherein the coating has an axial groove therein; and
wherein the optical fiber and the coating are co-extruded in a concentric fashion.

39. The strap of claim 38, wherein the coating has plural transverse ridges protruding therefrom.

40. The strap of claim 39, wherein the ridges are angled ridges.

41. The strap of claim 38, wherein the coating is a plastic coating.

* * * * *